(12) United States Patent
Freedman et al.

(10) Patent No.: US 10,599,919 B2
(45) Date of Patent: Mar. 24, 2020

(54) DETECTION OF HAND GESTURES USING GESTURE LANGUAGE DISCRETE VALUES

(71) Applicant: Microsoft Technology Licensing, LLC, Redmond, WA (US)

(72) Inventors: Daniel Freedman, Zikhron-Yaakov (IL); Kfir Karmon, Petach-Tikva (IL); Eyal Krupka, Shimshit (IL); Yagil Engel, Tel-Aviv (IL); Yevgeny Shapiro, Nazareth Ilit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 14/985,680

(22) Filed: Dec. 31, 2015

(65) Prior Publication Data
US 2017/0193288 A1    Jul. 6, 2017

(51) Int. Cl.
| | |
|---|---|
| *G06K 9/00* | (2006.01) |
| *G06F 3/01* | (2006.01) |
| *G06F 3/03* | (2006.01) |
| *G06F 3/038* | (2013.01) |
| *G06T 7/246* | (2017.01) |

(52) U.S. Cl.
CPC ......... *G06K 9/00355* (2013.01); *G06F 3/017* (2013.01); *G06F 3/0304* (2013.01); *G06F 3/038* (2013.01); *G06K 9/00389* (2013.01); *G06T 7/248* (2017.01); *G06F 2203/0381* (2013.01);
(Continued)

(58) Field of Classification Search
CPC ..... G06K 2009/00395; G06K 9/00335; G06K 9/00342; G06K 9/00355; G06K 9/00375; G06K 9/00382; G06K 9/00389
See application file for complete search history.

(56) References Cited

U.S. PATENT DOCUMENTS

| | | | | |
|---|---|---|---|---|
| 6,591,146 | B1 * | 7/2003 | Pavlovic | ............ G06K 9/00335 |
| | | | | 700/29 |
| 8,396,247 | B2 * | 3/2013 | Zhang | ................ G06K 9/00362 |
| | | | | 382/103 |

(Continued)

OTHER PUBLICATIONS

Chen et al ("SVM-based State Transition Framework for Dynamical Behavior Identification", 2009).*
(Continued)

*Primary Examiner* — Avinash Yentrapati

(57) ABSTRACT

Computer implemented method for detecting a hand gesture of a user, comprising:
(a) Receiving sequential logic models each representing a hand gesture. The sequential logic model maps pre-defined hand poses and motions each represented by a hand features record defined by discrete hand values each indicating a state of respective hand feature.
(b) Receiving a runtime sequence of runtime hand datasets each defined by discrete hand values scores indicating current state hand features of a user's moving hand which are inferred by analyzing timed images depicting the moving hand.
(c) Submitting the runtime hand datasets and the pre-defined hand features records in SSVM functions to generate estimation terms for the runtime hand datasets with respect to the hand features records.
(d) Estimating which of the hand gestures best matches the runtime sequence depicted in the timed images by optimizing score functions using the estimation terms for the runtime hand datasets.

25 Claims, 12 Drawing Sheets

(52) U.S. Cl.
CPC ............... *G06T 2207/20081* (2013.01); *G06T 2207/30196* (2013.01)

(56) References Cited

U.S. PATENT DOCUMENTS

| | | | | | |
|---|---|---|---|---|---|
| 8,428,368 | B2* | 4/2013 | Ivanich | ................ | H04N 5/4403 382/103 |
| 8,520,906 | B1* | 8/2013 | Moon | ................ | G06K 9/6263 382/118 |
| 9,069,385 | B1* | 6/2015 | Lynch | ................ | G06F 3/017 |
| 2008/0147725 | A1* | 6/2008 | Jung | ................ | G06F 8/24 |
| 2008/0192005 | A1* | 8/2008 | Elgoyhen | ................ | G06F 3/014 345/158 |
| 2008/0244468 | A1* | 10/2008 | Nishihara | ................ | G06F 3/017 715/863 |
| 2010/0066676 | A1* | 3/2010 | Kramer | ................ | G06F 3/017 345/158 |
| 2010/0082613 | A1* | 4/2010 | Liu | ................ | G06F 16/334 707/726 |
| 2010/0082614 | A1* | 4/2010 | Yang | ................ | G06K 9/6256 707/726 |
| 2010/0082617 | A1* | 4/2010 | Liu | ................ | G06F 16/334 707/729 |
| 2010/0164986 | A1* | 7/2010 | Wei | ................ | G06K 9/32 345/619 |
| 2011/0041100 | A1* | 2/2011 | Boillot | ................ | G06F 3/011 715/863 |
| 2011/0234840 | A1* | 9/2011 | Klefenz | ................ | G06K 9/00375 348/222.1 |
| 2012/0225719 | A1* | 9/2012 | Nowozin | ................ | G06F 3/017 463/36 |
| 2012/0323521 | A1* | 12/2012 | De Foras | ................ | G06F 3/017 702/141 |
| 2014/0143738 | A1* | 5/2014 | Underwood, IV | ...... | H04L 51/38 715/863 |
| 2014/0169623 | A1* | 6/2014 | Liu | ................ | G06K 9/00335 382/103 |
| 2015/0138078 | A1* | 5/2015 | Krupka | ................ | G06K 9/00389 345/156 |
| 2015/0338916 | A1* | 11/2015 | Priyantha | ................ | G06F 3/017 345/173 |
| 2016/0085958 | A1* | 3/2016 | Kang | ................ | G06F 21/40 726/19 |
| 2017/0003749 | A1* | 1/2017 | Anglin | ................ | G06F 3/017 |
| 2017/0193288 | A1* | 7/2017 | Freedman | ............. | G06F 3/0304 |

OTHER PUBLICATIONS

Oviatt, Sharon, and Philip Cohen. "Perceptual user interfaces: multimodal interfaces that process what comes naturally." Communications of the ACM 43.3 (2000): 45-53.*

Cao, Yunbo, et al. "Adapting ranking SVM to document retrieval." Proceedings of the 29th annual international ACM SIGIR conference on Research and development in information retrieval. ACM, 2006.*

Chen, Chen-Yu, et al. "SVM-based state transition framework for dynamical human behavior identification." Acoustics, Speech and Signal Processing, 2009. ICASSP 2009. IEEE International Conference on. IEEE, 2009.*

Quek, Francis, et al. "Multimodal human discourse: gesture and speech." ACM Transactions on Computer-Human Interaction (TOCHI) 9.3 (2002): 171-193. (Year: 2002).*

Wang, Xiaoyan, et al. "Hidden-markov-models-based dynamic hand gesture recognition." Mathematical Problems in Engineering (Year: 2012).*

Oka, Kenji, Yoichi Sato, and Hideki Koike. "Real-time tracking of multiple fingertips and gesture recognition for augmented desk interface systems." Proceedings of Fifth IEEE International Conference on Automatic Face Gesture Recognition. IEEE, 2002. (Year: 2002).*

International Search Report and the Written Opinion dated Mar. 24, 2017 From the International Searching Authority Re. Application No. PCT/US2016/068160. (16 Pages).

Chen et al. "SVM-Based State Transition Framework for Dynamical Human Behavior Identification", IEEE International Conference on Acoustics, Speech and Signal Processing, ICASSP 2009, Apr. 19-24, 2009, XP031459634, p. 1933-1936, Apr. 19, 2009. Abstract, p. 1933-1935, Figs. 1, 2.

Cherian et al. "Mixing Body-Part Sequences for Human Pose Estimation", 2014 IEEE Conference on Computer Vision and Pattern Recognition, CVPR'14, Jun. 23-28, 2014, XP032649588, p. 2361-2368, Jun. 23, 2014. Abstract, p. 2361-2364.

* cited by examiner

DETECTION OF HAND GESTURES USING GESTURE LANGUAGE DISCRETE VALUES

RELATED APPLICATIONS

This application is related to co-filed, co-pending and co-assigned U.S. Patent Applications entitled "HAND GESTURE API USING FINITE STATE MACHINE AND GESTURE LANGUAGE DISCRETE VALUES" (U.S. application Ser. No. 14/985,691), "MULTIMODAL INTERACTION USING A STATE MACHINE AND HAND GESTURES DISCRETE VALUES" (U.S. application Ser. No. 14/985,716), "RECOGNITION OF HAND POSES BY CLASSIFICATION USING DISCRETE VALUES" (U.S. application Ser. No. 14/985,741), "TRANSFORM LIGHTWEIGHT SKELETON AND USING INVERSE KINEMATICS TO PRODUCE ARTICULATE SKELETON" (U.S. application Ser. No. 14/985,777), "STRUCTURE AND TRAINING FOR IMAGE CLASSIFICATION" (U.S. application Ser. No. 14/985,803), "TRANSLATION OF GESTURE TO GESTURE CODE DESCRIPTION USING DEPTH CAMERA" (U.S. application Ser. No. 14/985,804), "GESTURES VISUAL BUILDER TOOL" (U.S. application Ser. No. 14/985,775, and "ELECTRICAL DEVICE FOR HAND GESTURES DETECTION" (U.S. application Ser. No. 14/985,728), the disclosures of which are incorporated herein by reference.

BACKGROUND

With the evolution of computerized environments, the use of human-machine interfaces (HMI) has dramatically increased. A growing need is identified for more natural human-machine user interface (NUI) methods such as, for example, voice and/or gaze and more specifically for hand gestures interaction to replace and/or complement traditional HMI such as, for example, keyboards, pointing devices and/or touch interfaces. Doing so may serve to, for example, eliminate and/or reduce the need for intermediator devices (such as keyboard and/or pointing devices), support hands free interaction, improving accessibility to population(s) with disabilities and/or provide a multimodal interaction environment. Current solutions for identifying and/or recognizing hand(s) gestures may exist, however they are mostly immature, present insufficient accuracy and/or high complexity while requiring high computation resources for extensive computer vision processing and/or machine learning. Such technologies may rely on full hand skeleton articulation and/or complex machine learning algorithms for detection and/or classification of hand gestures which may make such implementations costly and unattractive for integration preventing them from being adopted for wide scale usage.

SUMMARY

According to some embodiments of the present disclosure, there are provided systems and methods for detecting hand gestures of a user by estimating a runtime sequence of one or more runtime hand datasets through analysis of one or more images depicting movement of hand(s) of a user with respect to a plurality of pre-defined hand gestures to identify the runtime sequence as a valid hand gesture. The pre-defined hand gestures as referred to hereinafter throughout this disclosure refers to pre-defined hand gestures representations which simulate respective hand gestures of a hand(s). In the same manner, definition, creation, construction and/or generation of hand gestures, hand poses and/or hand motions as referred to hereinafter throughout this disclosure refers to definition, creation, construction and/or generation of representations of hand gestures, hand poses and hand motions respectively which simulate respective hand gestures, poses and motions of a hand(s). The pre-defined hand gestures are constructed using a discrete values architecture where each of the pre-defined hand gestures may include one or more hand poses and/or hand motions. Each of the hand poses and hand motions is represented as a pre-defined hand features record which is defined by discrete hand values each indicating a state of a corresponding hand feature (characteristic) of the depicted hand such as, for example, various finger and/or hand states and/or motions. Similarly, each of the one or more runtime hand datasets may include one or more hand poses and/or hand motions each defined by a runtime hand dataset comprising one or more discrete hand values scores each indicating a current state of a corresponding hand feature. Continuous values of the one or more hand features may be represented by discrete hand values by quantizing the continuous values to support the discrete architecture of the hand gesture detection process. The one or more discrete hand values scores are inferred by analyzing the one or more images depicting the hand of the user. Each of the runtime hand datasets is submitted to one or more structured support vector machine (SSVM) functions together with one or more of the pre-defined hand features records to generate a plurality of estimation terms for the runtime hand dataset with respect to each of the pre-defined hand features records. The runtime hand datasets may then be estimated to comply as one of the pre-defined hand features records by identifying an optimal pre-defined hand features record by resolving a weighted calculation using the estimation terms with the discrete hand values scores and discrete hand values. Each of the pre-defined hand gestures is optionally defined by one or more sequential logic models and may be represented by a finite state machine (FSM) documenting transitions between hand pose(s) and/or hand motion(s). The optimization process to identify the optimal pre-defined hand gestures that best describes the depicted runtime sequence may be done through dynamic programming using, for example, viterbi decoding after augmenting the sequential logic model of the pre-defined hand gesture FSM with one or more score functions over one or more sequences within the FSM. Optionally, hand gestures detection is not limited to specific pre-defined hand gestures but rather an entire class of hand gestures consisting of hand poses and/or hand motions may be detected where the hand poses and/or hand motions are constructed using the discrete hand values architecture may be detected.

According to some embodiments of the present disclosure, there are provided systems and methods for detecting multimodal user interaction acts which may include on or more actions, for example, a hand gesture, a head gesture, a body gesture, a facial expression, a gaze direction, a text, a voice, and/or a tactile input. Detection of the multimodal acts may be performed for a user using one or more computerized devices attached to one or more capturing devices. The captured multimodal user interaction may be processed to identify one or more of the multimodal acts and optionally initiate one or more application functions, actions, operations and/or commands which may be associated with the detected multimodal act(s).

Detecting the one or more hand gestures of the user as depicted in the image(s) by estimating the discrete hand values scores of the runtime hand dataset compared to the discrete hand values of the pre-defined hand gesture features records may dramatically reduce the required computation load in runtime. The detection process is reduced to an optimization process over the plurality of discrete hand values of the runtime hand dataset and those of the pre-defined hand gestures where the optimization is performed over binary representations of the discrete hand values. Furthermore due to the discrete nature of the detection process in which the discrete hand values are processed, a finite number of possible values, for example 5, 10 and/or 20 may be valid for each hand feature avoiding the need to fully articulate the hand skeleton thus further reducing computer vision and modeling resources.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
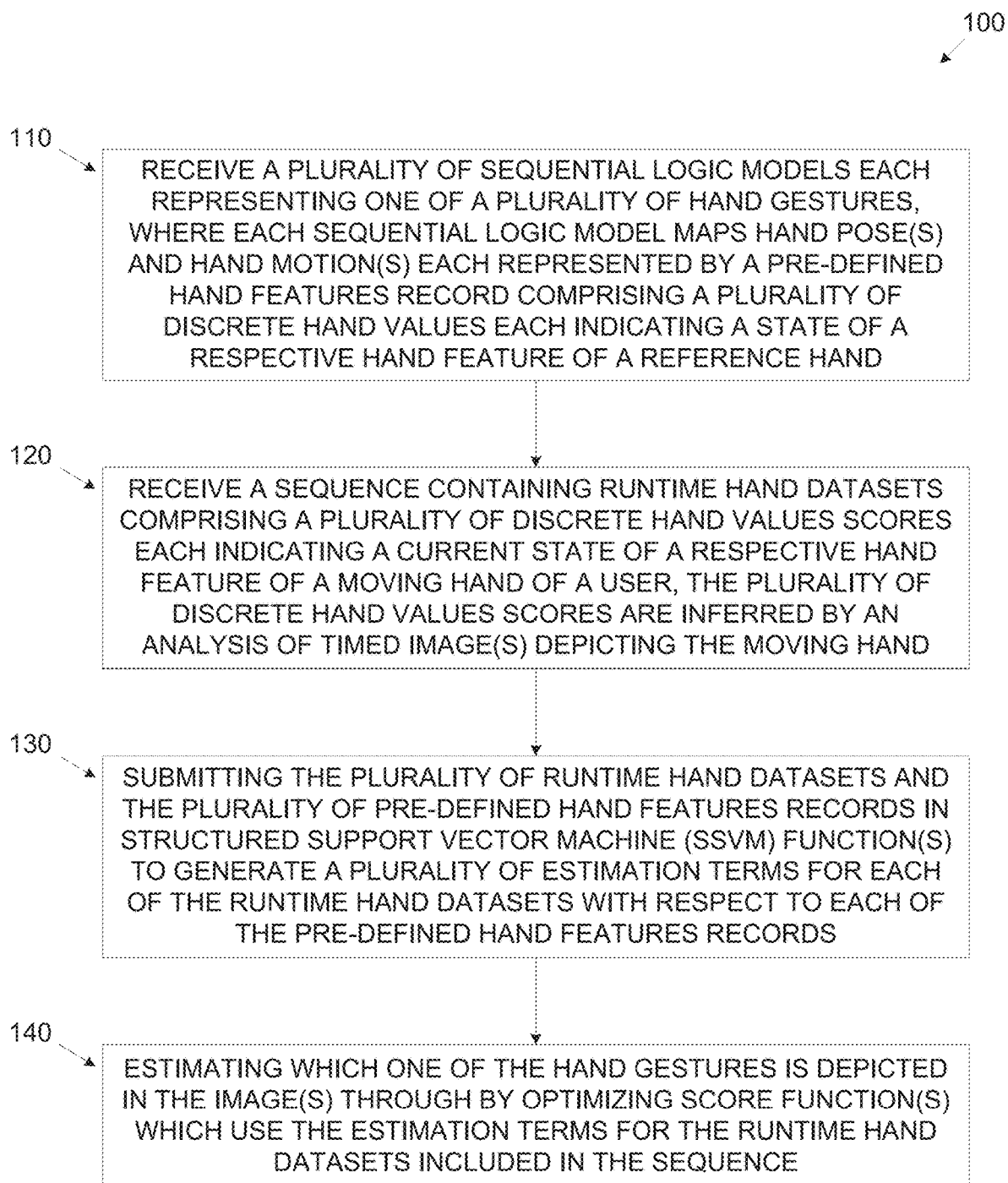
FIG. 1 is a flowchart of an exemplary process for detecting a hand gesture depicted by an image(s), according to some embodiments of the present disclosure.

According to some embodiments of the present disclosure, there are provided systems and methods for detecting hand gestures of a user by estimating a runtime sequence of one or more runtime hand datasets through analysis of one or more images depicting movement of hand(s) of a user with respect to a plurality of pre-defined hand gestures to identify the runtime sequence as a valid hand gesture. Detection of the hand gestures performed by the user and depicted in the one or more images is based on a discrete architecture in which discrete hand values serve as building blocks to define hand poses and/or hand motions constituting hand gestures. Each hand gesture may include one or more hand poses and/or hand motions each represented as a pre-defined hand features record which may be a hand pose features record or a hand motion features record respectively. The hand features records are each defined by a unique set of discrete hand values each indicating a state of a corresponding one of a plurality of hand features (characteristics) of the depicted hand such as, for example, various finger and/or hand states and/or motions. The hand features include hand pose features and hand motion features each associated with one or more discrete pose values and discrete motion values respectively. Each of the pre-defined hand gestures may be represented as sequential logic model comprising one or more hand poses and/or hand motions which are each represented by a hand features record which are in turn defined through a plurality of discrete hand values. In the same manner each of the one or more images capturing the one or more runtime hand datasets constituting the runtime sequence of hand movements of the user are analyzed to identify it as a hand pose or a hand motion and further infer one or more of discrete hand values from which each runtime hand dataset is constructed. The discrete hand values identified for each of the runtime hand datasets are referred to as discrete hand values scores and may include discrete pose values or discrete motion values each indicating a current (runtime) value of a corresponding one of the plurality of hand feature. Continuous values of the one or more hand features may be represented by discrete hand values by quantizing the continuous values to support the discrete architecture of the hand gesture detection process. Since the pre-defined hand poses (representations) and/or hand motions (representations) as well as the runtime hand datasets are defined through a plurality of discrete hand values, estimation of the runtime sequence as one of the pre-defined hand gestures is basically an optimization problem in which an optimal pre-defined hand gesture best describing the runtime sequence is selected. Each of the one or more runtime hand datasets is submitted to one or more SSVM functions together with one or more of the pre-defined hand features records to generate a plurality of estimation terms for the runtime hand dataset with respect to each of the pre-defined hand features records. The estimation terms include singleton terms and pairwise terms. The singleton terms define a correlation between each of the runtime hand datasets and one of the pre-defined hand features records. The pairwise terms define a correlation between each of the runtime hand datasets and a two (current and predecessor) of the pre-defined hand features records. The runtime sequence may then be estimated to comply as one of the pre-defined hand gestures by resolving an optimal matching pre-defined hand features record for each of the one or more runtime hand datasets. The singleton and/or pairwise terms may be generated by simulating the discrete hand values of the pre-defined hand poses and/or hand motions over the discrete hand values scores of each of the runtime hand datasets. The pre-defined hand features records may be represented as a Boolean formula, for example, conjunctive normal form (CNF). The one or more SSVM functions may apply one or more parametric functions to generate the singleton terms and/or the pairwise terms. The one or more SSVM functions may be trained offline to identify the most accurate estimation terms to be associated with each of the pre-defined hand features records. Each of the one or more sequential logic models defining the one or more hand gestures may be represented by an FSM in which each hand features record (hand pose or hand motion) is a state and the FSM documents transitions between the hand pose(s) and/or hand motion(s). Prior to initiating the optimization process, the FSM representing the one or more pre-defined hand gestures may be augmented with one or more score functions over sequences within the FSM in order to allow for an efficient and accurate optimization, each of the one or more sequences within the FSM representing a hand gesture. The optimization process may be performed through dynamic programming which may utilize, for example, viterbi decoding over the one or more score functions using the generated singleton terms and/or the pairwise terms. Once complete, the optimization process yields an optimal pre-defined hand gesture which best matches the runtime sequence of movements of the hand of the user as depicted in the one or more images. Optionally, one or more weights are assigned to each of the estimation terms to improve the optimization process. The one or more weights may be calculated by for example, one or more SSVM functions which may be trained to select the best matching weights for each of the pre-defined hand features records. Optionally, the runtime sequence of runtime hand datasets may be estimated as a sequential logic model of a hand gesture which is not pre-defined but is rather possible to construct using the discrete architecture discrete hand values each indicating a value of a corresponding one of the hand features. Optionally, the one or more SSVM functions are specialized to identify the runtime sequence as one of a plurality of registered hand gestures. The one or more registered hand gestures may be registered based on a context of an activity of the user, for example, one or more of the pre-defined hand gestures may be registered (associated) with a specific application. In the event the specific application is active during the detection of the user hand movement as depicted in the runtime sequence, only the registered hand gestures are considered by the optimization process for selecting the optimal hand gesture best matching the runtime sequence.

Basing the detection of user hand gestures on the discrete architecture may dramatically reduce the runtime computation load since the need for full hand skeleton modeling is avoided by employing an optimization process over the plurality of discrete hand values (pre-defined) and the discrete hand values scores (runtime) which present a finite number of possible values. Furthermore, the optimization is based on estimation terms which are generated using binary representation of the hand poses and/or hand motions which further reduces the complexity of computation since binary computation requires considerably less processing resources compared to continuous representations a skeletal hand. Specializing the one or more SSVM functions may reduce even more the computation load at runtime since a limited number of pre-defined hand gestures are considered during the optimization process makes the optimization process may become simpler and faster.

According to some embodiments of the present disclosure, there are provided systems and methods for detecting multimodal user interaction acts comprising one or more actions, for example, a hand gesture, a head gesture, a body gesture, a facial expression, a gaze direction, a text, a voice, and/or a tactile input. Detection of the multimodal acts may be performed for a user using one or more computerized devices, for example, computer, mobile device, computerized machine and/or computerized appliance equipped and/or attached to one or more user interaction capturing devices, for example, an imaging device, a sound recorder, a tactile reception device, a text input device such as, for example, such as a keyboard, a digital pen, a touchpad and the likes, a touchscreen, a digital surface and/or a pointing device(s) such as for example, a mouse, a trackball, a game controller, a joystick and the likes. The captured multimodal user interaction may be processed to identify the one or more multimodal acts and optionally initiate one or more application functions, actions, operations and/or commands which may be associated with the detected multimodal act(s). The multimodal acts may be classified and/or identified during runtime by employing one or more detection techniques to identify the one or more user actions constituting the multimodal act, for example, text input parsing, pointing device input analysis, speech analysis, tactile input analysis and specifically hand gesture detection.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a flowchart of an exemplary process for detecting a hand gesture depicted by an image(s), according to some embodiments of the present disclosure. An exemplary hand gesture detection process 100 presents a detection process of movements a hand of a user depicted in one or more images as a pre-defined hand gesture. As shown at 110, the exemplary process 100 starts with receiving a plurality of pre-defined hand gestures each represented as a sequential logic model. Each of the sequential logic models may map one or more hand poses and/or hand motions each represented by a unique one of a plurality of hand features records. The hand features record may be a hand pose features record or a hand motion features record each associated with the hand pose and the hand motion respectively. Each of the hand features records is defined by one or more of a plurality of discrete hand values each indicating a state of a respective hand feature, for example, a pose of a palm, a pose of a finger(s), a motion of the palm and/or a motion of the finger(s). Similarly, the discrete hand values may be discrete pose values and/or discrete motion values each indicative of a state of a corresponding hand feature which may be a hand pose feature and/or a hand motion feature.

As shown at 120, a runtime sequence is received which includes one or more of a plurality of runtime hand datasets. Each of the runtime hand datasets is defined by a plurality of discrete hand values scores each indicating a current state of a respective hand feature of a moving hand of the user. The plurality of the discrete hand values scores are inferred and/or calculated by analyzing one or more of a plurality of images depicting the moving hand of the user.

Before further describing the hand gesture detection process 100 it is important to understand the discrete architecture used for defining hand gestures, hand poses and/or hand motions. The discrete hand features defining the hand features records as well as the discrete hand features scores defining the runtime hand datasets all refer to the same discrete hand values as presented herein. The discrete hand values may be discrete pose values or discrete motion values. Continuous values of the one or more hand features may be represented by discrete hand values by quantizing the continuous values to support the discrete architecture of the hand gesture detection process.

Figure 2:
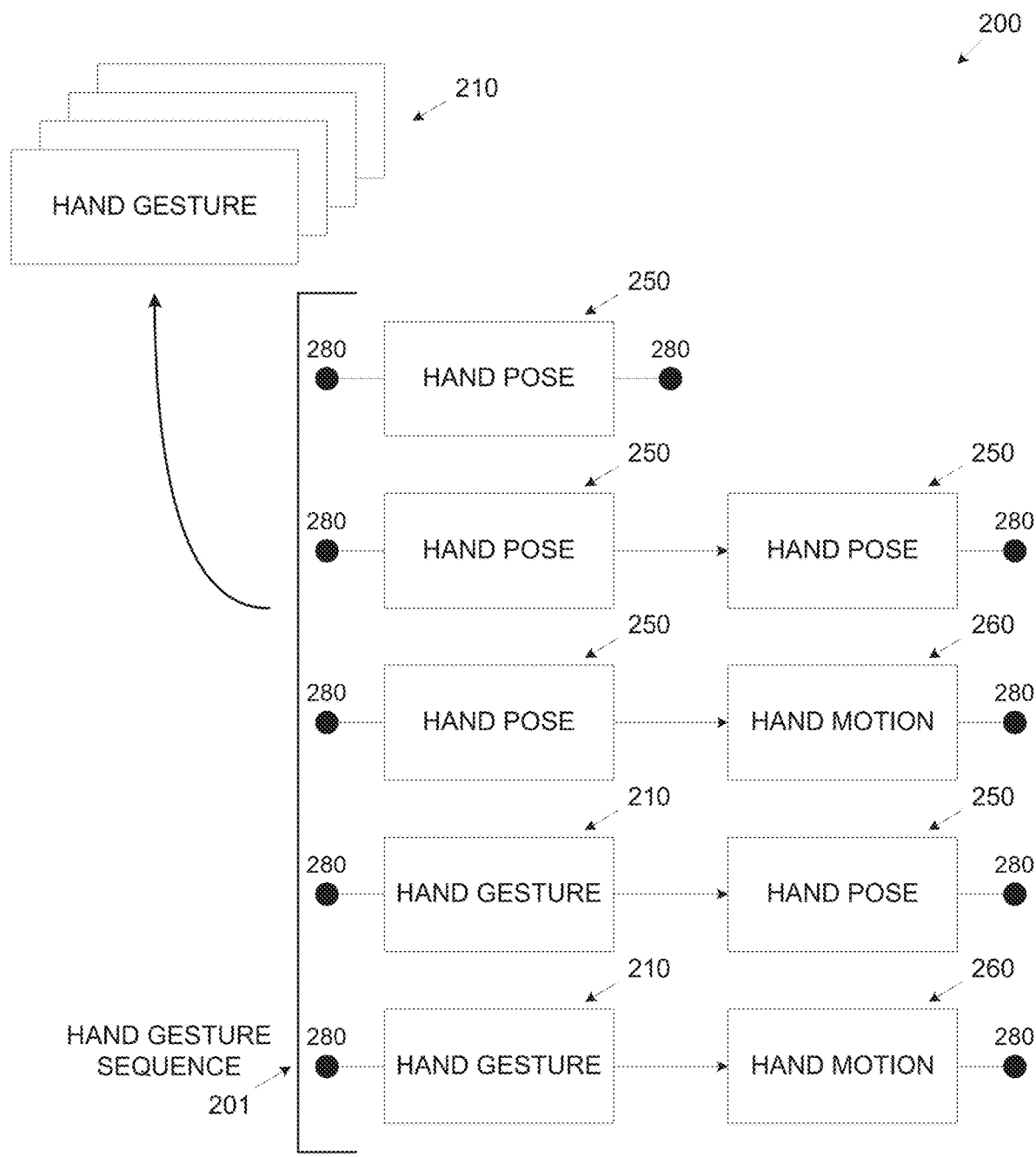
FIG. 2 is a block diagram of the building blocks of exemplary hand gestures, according to some embodiments of the present disclosure.

Reference is now made to FIG. 2 which is a block diagram of the building blocks of an exemplary hand gesture, according to some embodiments of the present disclosure. Illustration 200 depicts several construction schemes of exemplary hand gestures 210. The hand gestures 210 may be created through one or more possible constructions, for example:

(a) The hand gesture 210 may consist of a hand pose 250.
(b) The hand gesture 210 may be a combination and/or sequence of two hand poses 250.
(c) The hand gesture 210 may be a combination and/or sequence of the hand pose 250 and a hand motion 260.
(d) The (first) hand gesture 210 may be a combination and/or sequence of a second hand gesture 210 and the hand pose 250. The second hand gesture may be the same gesture as the first one or it may be a different hand gesture 210.
(e) The (first) hand gesture 210 may be a combination and/or sequence of a second hand gesture 210 and the hand motion 260. The second hand gesture 210 may be the same gesture as the first one or it may be a different hand gesture 210.

The hand gesture 210 may be created through multiple iterations of the constructions (d) and/or (e) above. Each hand gesture 210 is constructed as a unique combination and/or sequence represented by a hand gesture sequence 201 which comprises of the one or more of hand poses 250, hand motions 260 and/or hand gestures 210. Each of the hand gestures 210 starts and ends with an idle state 280 which may be a virtual state identifying the start and/or the end of the unique hand gesture sequence 201 of the hand gesture 210. The hand gesture sequence 201 may be considered a sequential logic model describing the hand gesture 210.

Figure 3:
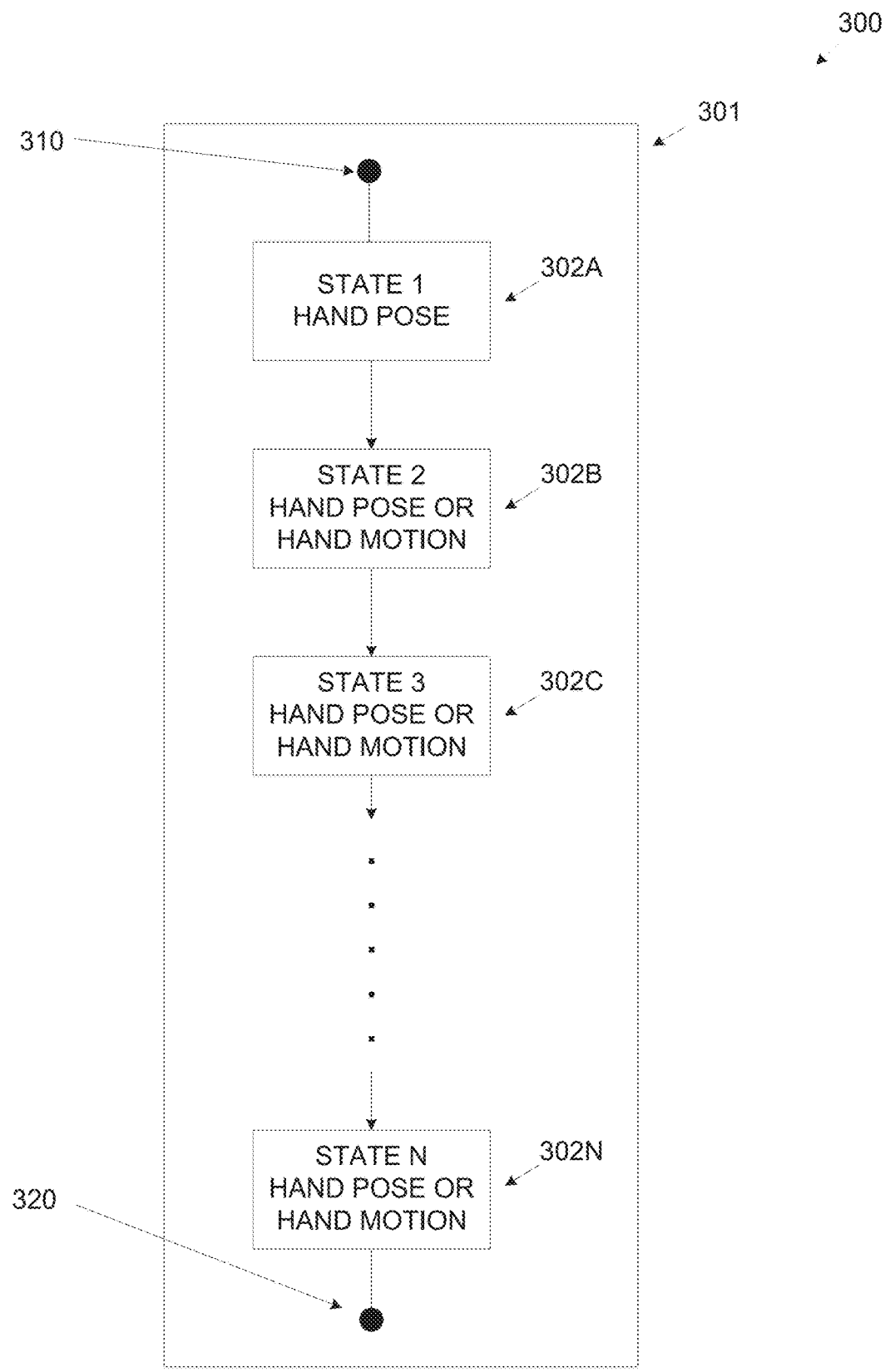
FIG. 3 is a schematic illustration of an exemplary FSM representing a hand gestures sequential logic model as a sequence of hand motions and hand poses, according to some embodiments of the present disclosure.

Reference is now made to FIG. 3 which is a schematic illustration of an exemplary FSM representing a hand gestures sequential logic model as a sequence of hand motions and hand poses, according to some embodiments of the present disclosure. An illustration 300 depicts an FSM 301 which may represent a sequential logic model of a hand gesture sequence such as the hand gesture sequence 201. The FSM 301 starts with a start point 310 indicating a starting state for the FSM 301. The FSM 301 may include one or more states 302A, 302B, 302C through 302N. The first state 302A is a hand pose such as the hand pose 250 which may describe a start of a sequence representing a hand gesture such as the hand gesture 210. Each of the succeeding states 302B, 302C through 302N may be either a hand pose 250 or a hand motion such as the hand motion 260. The FSM 301 is ended with an FSM end point 320. The start point 310 and/or the end point 320 may be defined as a virtual idle state such as the idle state 280. During detection process of the hand gesture 210 such as the hand gesture detection process 100, the FSM 301 may be augmented with one or more score functions over one or more sequences within the FSM 301 in order to allow processing one or more runtime hand datasets included in a runtime sequence depicting a moving hand of a user compared to each of the hand poses 250 and/or hand motions 260 comprising each of the sequences in the FSM 301. Each of the hand poses 250 and/or hand motions 260 is represented by a respective hand pose features record and a hand motion features record. Using the FSM 301 to represent each of the plurality of hand gesture sequences 201 each correlating to one of the hand gestures 210, allows to significantly simplify the estimation of the runtime sequence of runtime hand datasets to detect it as one of pre-defined hand gestures such as the hand gestures 210 in runtime using dynamic programming by applying, for example, viterbi decoding over the score function(s) which augmented the FSM 301.

Figure 4:
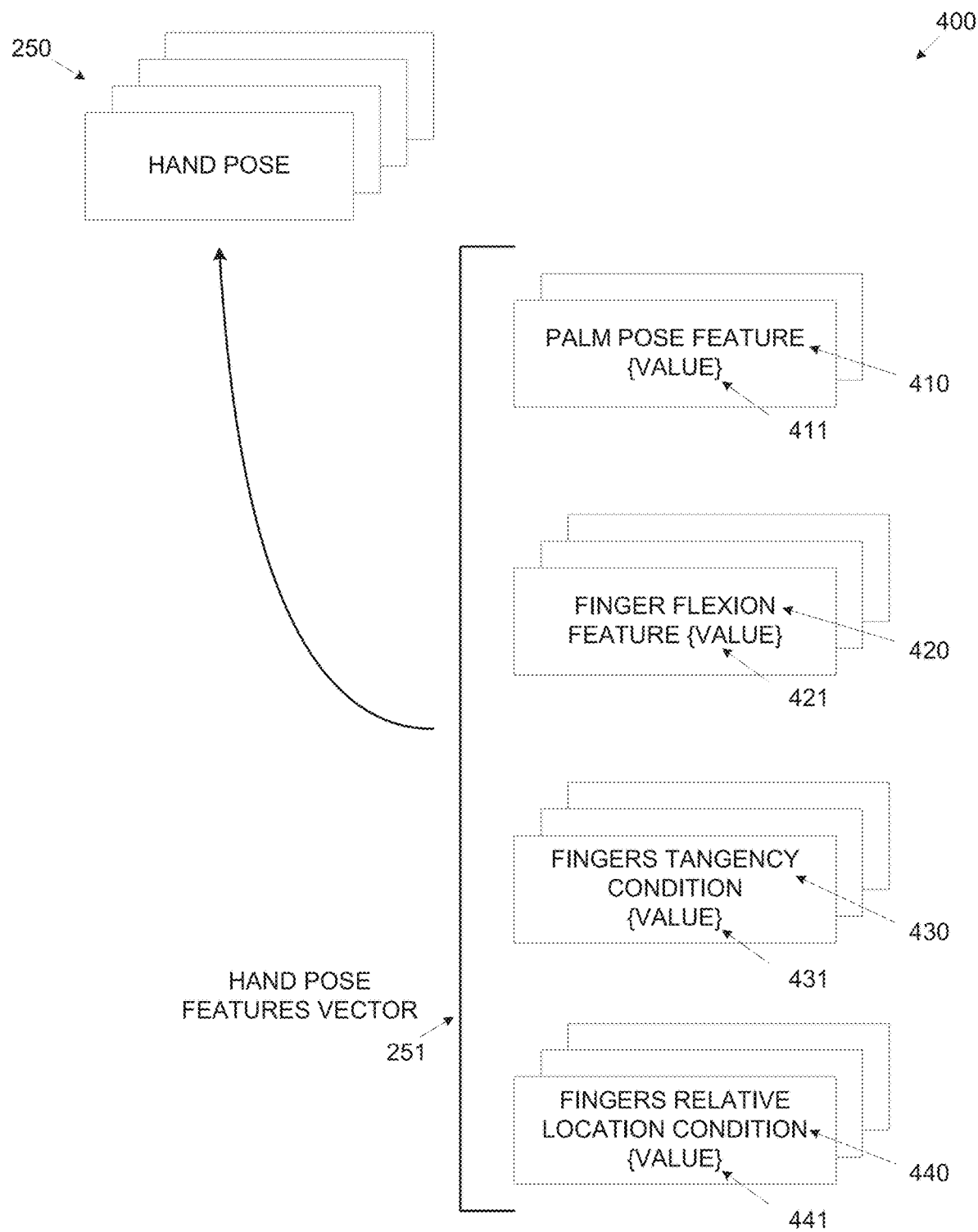
FIG. 4 is a schematic illustration of exemplary hand poses discrete representation, according to some embodiments of the present disclosure.

Reference is now made to FIG. 4 which is a schematic illustration of exemplary hand poses discrete representation, according to some embodiments of the present disclosure. Illustration 400 depicts exemplary hand poses 250 representation as a hand pose features record 251 which includes one or more hand pose features 410, 420, 430 and 440. The hand pose features records 251 which was referenced within the generalized term of hand features record may be represented with one or more of the discrete pose value 411, 421, 431 and/or 441 each indicating a state (value) of the respective hand pose feature 410, 420, 430 and/or 440 for an associated hand pose of the hand poses 250. The combination of the one or more discrete pose values 411, 421, 431 and/or 441 of the respective hand pose features 410, 420, 430 and 440 as defined by the hand pose features record 251 identifies a specific pose of the hand poses 250 which may be detected by analyzing one or more images depicting movement of a user's hands. Continuous values of the one or more hand pose features 410, 420, 430 and/or 440 may be represented by the discrete pose values 411, 421, 431 and/or 441 by quantizing the continuous values. The hand pose features record 251 may be represented as, for example, a features vector, a features matrix and/or a features table. The hand pose features record 251 may include values of one or more of the following exemplary hand pose features:

Palm pose features—one or more palm pose features 410 include, for example, hand selection, palm direction, palm rotation and/or hand location. Hand selection may identify which hand is active and may include discrete pose values 411 such as, for example, right, left, both and/or any. Palm direction may define the direction in which the palm of the active hand is facing and may include discrete pose values 411 such as, for example, left, right, up, down, forward and/or backward. Palm rotation may define the rotation state of the palm of the active hand and may include discrete pose values 411 such as, for example, left, right, up, down, forward and/or backward. Hand location may identify the spatial location of the active hand in space and may include discrete pose values 111 such as, center of field of view (FOV), right side of FOV, left side of FOV, top of FOV, bottom of FOV, front of FOV and/or rear of FOV. Where FOV is for example, the visible space of an imaging device monitoring the movement of the user's hand. Optionally, hand location is identified with respect to a fixed object present in the FOV, for example, keyboard and/or pointing device so that hand location may be defined by discrete pose values 411 such as, for example, above_keyboard, behind_keyboard, right_of_keyboard and/or left_of_keyboard.

Finger flexion features—one or more finger flexion features 420 which are defined per finger. For example, a finger feature 420 may be a flexion and/or curve state which may include discrete pose values 421 such as, for example stretched, folded and/or open represented, for example by 0, 1, and 2. Each finger (thumb, index, middle, ring and/or pinky) is assigned one or more specific finger features, for example, {thumb, middle, ring, pinky} in {folded} state and {index} in {stretched} state.

Finger tangency condition features—one or more fingers tangency features 430 which are defined per finger. The tangency feature may define a touch condition of any two or more fingers and/or touch type and may include discrete pose values 431 such as, for example, not touching, fingertip and/or full touch.

Finger relative location condition features—one or more fingers relative location features 440 are defined per finger. Each of the finger relative location condition features 440 may define a relative location of one finger in relation to another. The fingers relative location features 440 may include discrete pose values 441 such as, for example, one or more fingers are located relatively to another one or more fingers to the left, right, above, below, inward, outward, in front and/or behind.

Each one of the hand poses 250 is defined by a unique one of the hand pose features records 251 which may be a combination and/or sequence of one or more discrete pose values 411, 421, 431 and/or 441 each indicating a value of the corresponding hand pose feature 410, 420, 430 and/or 440. The hand pose features records 251 may include only some (and not all) of the discrete pose values 411, 421, 431 and/or 441 while other discrete pose values 411, 421, 431 and/or 441 which are not included are left free. For example, the hand pose features records 251 may define a specific state of the fingers (for example discrete pose values 421, 431 and/or 441) while the direction of the palm is left unspecified (for example discrete pose value 411). In this case the hand pose 250 is detected in runtime by identification of the fingers state as defined by the hand pose features records 251 with the hand facing any direction. Detection of the one or more hand poses 250 is simplified since the discrete pose values 411, 421, 431 and/or 441 may be easily identified because there is a finite, limited number of possible states for each of the hand pose features 410, 420, 430 and/or 440 avoiding the need for hand skeleton modeling thus reducing the level of computer vision processing. The discrete representation of the hand pose features 410, 420, 430 and/or 440 may not be limited to discrete values only. Continuous values of the one or more hand features 410, 420, 430 and/or 440 may be represented by discrete pose values 411, 421, 431 and/or 441 respectively by quantizing the continuous values. For example, the palm rotation palm pose feature may be defined with 8 discrete motion values 411—0°, 45°, 90°, 135°, 180°, 225°, 270° and 315° to quantize the complete rotation range of 0°-360°.

Figure 5:
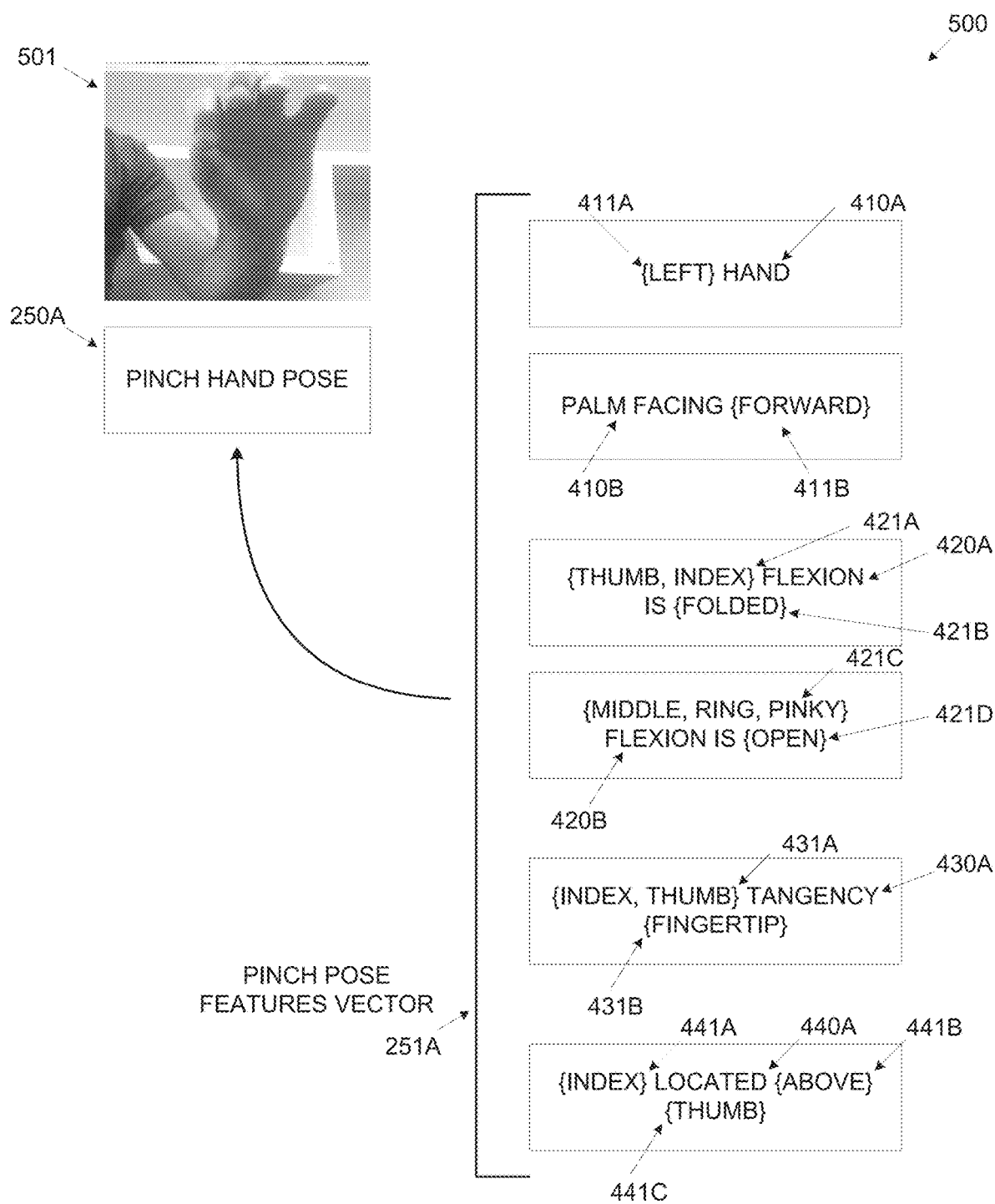
FIG. 5 is a schematic illustration of an exemplary pinch hand pose discrete representation, according to some embodiments of the present disclosure.

Reference is now made to FIG. 5 which is a schematic illustration of an exemplary pinch hand pose discrete representation, according to some embodiments of the present disclosure. Illustration 500 depicts an exemplary pinch hand pose 250A representation by a pinch pose features record 251A comprising discrete pose values such as the discrete pose values 411, 421, 431 and/or 441, each indicating a value of a corresponding pose feature such as the pose features 410, 420, 430 and/or 440. The pinch hand pose 250A which is visualized through an image capture 501 is defined by some of the plurality of discrete pose values 411, 421, 431 and 441 as follows:

A hand selection feature 410A is assigned a discrete pose value 411A to indicate the left hand is active.

A palm direction feature 410B is assigned a discrete pose value 411B to indicate the palm of the active hand is facing forward.

A fingers flexion feature 420A is assigned a discrete pose value 421A and a discrete flexion value 421B to indicate the thumb and index fingers are folded.

A fingers flexion feature 420B is assigned a discrete pose value 421C and a discrete pose value 421D to indicate the middle, ring and pinky fingers are open.

A fingers tangency condition feature 430A is assigned a discrete pose value 431A to indicate the thumb and index fingers are touching at their tips.

A fingers relative location feature 440A is assigned a discrete pose value 441A, a discrete pose value 441B and a discrete pose value 441C to indicate the index finger is located above the thumb finger.

As seen above, the pinch hand pose 250A is uniquely defined by a pinch features pose features record 251A comprising the discrete pose values 411A, 411B, 421A, 421B, 421C, 421D, 431A, 431B, 441A, 441B and 441C corresponding to the pose features 410A, 410B, 420A, 420B, 430A and 440A respectively. Similarly additional hand poses 250 may be defined.

Figure 6:
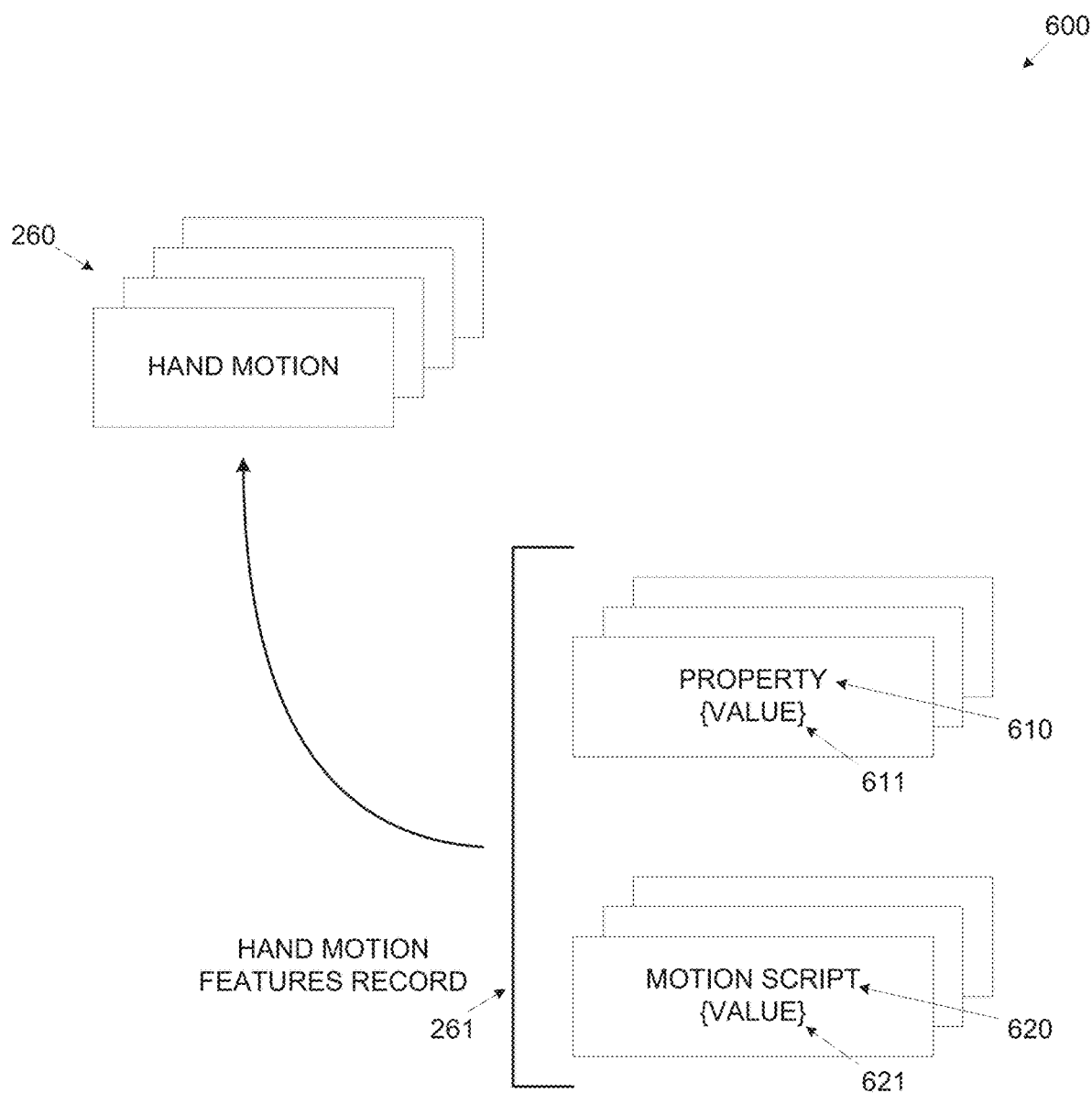
FIG. 6 is a schematic illustration of exemplary hand motions discrete representation, according to some embodiments of the present disclosure.

Reference is now made to FIG. 6 which is a schematic illustration of exemplary hand motions discrete representation, according to some embodiments of the present disclosure. Illustration 600 depicts each of a plurality of exemplary hand motions 260 representation as a hand motion features record 261. The hand motion features record 261 which was referenced within the generalized term of hand features record may include one or more hand motion features 610 and 620. Each of the hand motion features 610 and 620 may be assigned with one or more discrete motion values 611 and/or 621 which indicate a state (value) of the respective hand motion feature 610 and/or 620 for an associated hand motion of the hand motions 260. Continuous values of the one or more hand motion features 610 and/or 620 may be represented by the discrete motion values 611 and/or 621 by quantizing the continuous values. The hand motion features record 261 identifies a specific motion of a hand and/or finger(s) which may be detected by analyzing one or more images depicting movement of a user's hands. The hand motion features record 261 may be represented as, for example, a features vector, a features matrix and/or a features table. The hand motion features record 261 may include one or more of the following exemplary hand motion features:

Motion property features—one or more motion property features 610 may include, for example, motion size, motion speed and/or motion location. Motion size may identify the size (scope) of the motion, and may include discrete motion values 611 such as, for example, small, normal and/or large. Motion speed may define the speed of the motion and may include discrete motion values 611 such as, for example, slow, normal, fast and/or abrupt. Motion location may identify the spatial location in which the motion is performed, and may include discrete motion values 611 such as, for example, center of FOV, right side of FOV, left side of FOV, top of FOV, bottom of FOV, front of FOV and/or rear of FOV. Optionally, the hand location is identified with respect to a fixed object present in the FOV, for example, keyboard and/or pointing device so that hand location may include discrete motion values 611 such as, for example, above_keybord, behind_keyboard, right_of_keyboard and/or left_of_keyboard.

Motion script features—one or more motion script features 620 may define the actual motion performed. The motion script values 620 may include, for example, motion direction, motion start point, motion end point and/or pre-defined curve shapes. The motion direction feature 620 may include discrete motion values 621 such as, for example, upward, downward, left_to_right, right_to_left, diagonal_left_upward, diagonal_right_upward, diagonal_left_downward, diagonal_right_downward, clockwise_arc_right_upward, clockwise_arc_right_downward, clockwise_arc_left_upward, clockwise_arc_left_downward, counter_clockwise_arc_right_upward, counter_clockwise_arc_right_downward, counter_clockwise_arc_left_upward and/or counter_clockwise_arc_left_downward. Optionally, the motion curve shapes may include for example, at-sign (@), infinity sign (∞), digit signs, alphabet signs and the likes. Optionally, additional one or more curve shapes, for example, checkmark, bill request and the likes may be defined by the hand motion features record 261. Each of the motion script features 620 is defined for a two dimensional (2D) plane, however each of the motion script features 620 may be transposed to depict another 2D plane, for example, X-Y, X-Z and/or Y-Z. Optionally, the motion script features 620 define three dimensional (3D) motions and/or curves using a 3D image data representation format.

Each one of the hand motions 260 is defined by a unique one of the hand motion features records 261 which may a combination and/or sequence of one or more discrete motion values 611 and/or 621 each indicating a value of the corresponding hand motion features 610 and/or 620. Using the discrete motion values 621 and/or 621 allows for simple detection of the hand motions 260 as there are a finite number of discrete motion values 611 and/or 621 to be analyzed and estimated thus avoiding the need for full hand skeleton modeling thus reducing the level of computer vision processing. For instance the motion speed feature included in the hand motion property feature 610 may include up to four discrete motion values 611—slow, normal, fast and abrupt. Similarly additional hand motions 260 may be defined. The discrete representation of the hand motion features 610 and/or 620 may not be limited to discrete values only, continuous values of the one or more hand motion features 610 and/or 620 may be represented by discrete motion values 611 and/or 621 respectively by quantizing the continuous values. For example, the motion speed property feature may be defined with 6 discrete motion values 611—5 m/s (meter/second), 10 m/s, 15 m/s, 20 m/s, 25 m/s and 30 m/s to quantize the motion speed of a normal human hand of 0 m/s—30 m/s.

Figure 7:
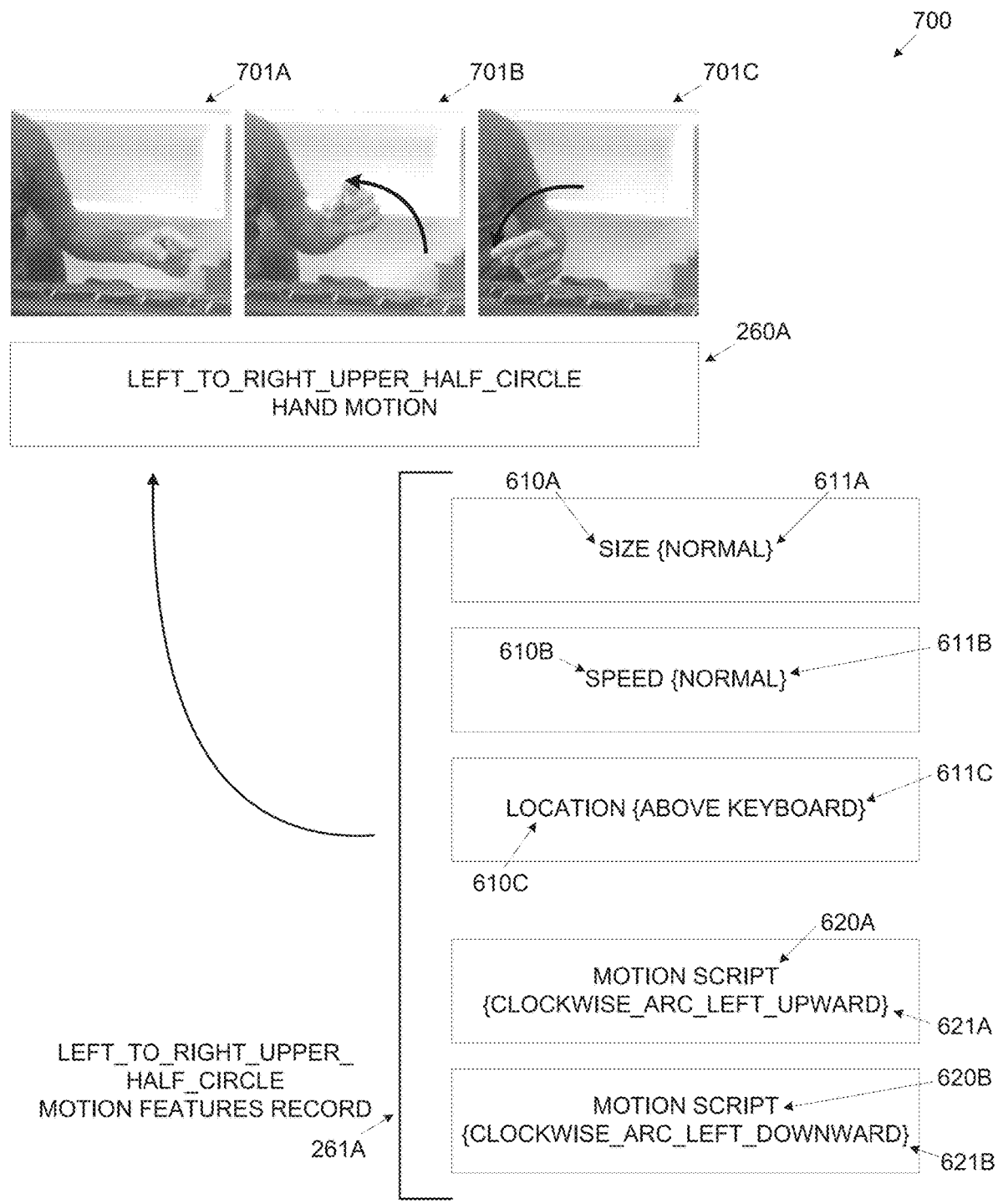
FIG. 7 is a schematic illustration of an exemplary half circle basic hand motion discrete representation, according to some embodiments of the present disclosure.

Reference is now made to FIG. 7 which is a schematic illustration of an exemplary half circle hand motion discrete representation, according to some embodiments of the present disclosure. Illustration 700 depicts an exemplary left_to_right_upper_half_circle hand motion 260A construction by a left_to_right_upper_half_circle motion features record 261A comprising discrete motion values such as the discrete motion values 611 and/or 621, each indicating a value of a corresponding hand motion feature such as the hand motion features 610 and/or 620. The left_to_right_upper_half_circle hand motion 260A which is visualized through image captures 701A, 701B and 701C is created with some of the plurality of discrete motion values 611 and 621 as follows:

A motion size feature 610A is assigned a discrete motion value 611A to indicate the motion size is normal.

A motion speed feature 610B is assigned a discrete motion value 611B to indicate the motion speed is normal.

A motion location feature 610C is assigned a discrete motion value 611C to indicate the motion is performed above a keyboard.

A first motion script feature 620A is assigned a discrete motion value 621A to indicate a motion shape of clockwise_arc_left_upward as presented by the image capture 701B.

A second motion script feature 620B is assigned a discrete motion value 621B to indicate a motion shape of clockwise_arc_left_downward as presented by the image capture 701C.

As seen above, the left_to_right_upper_half_circle motion 260A is uniquely defined by a left_to_right_upper_half_circle motion features record 261A comprising of the discrete motion values 611A, 611B, 611C, 621A and 621B corresponding to the hand motion features 610A, 610B, 610C, 620A and 620B respectively. Similarly additional hand and/or finger(s) motion may be defined.

Figure 8:
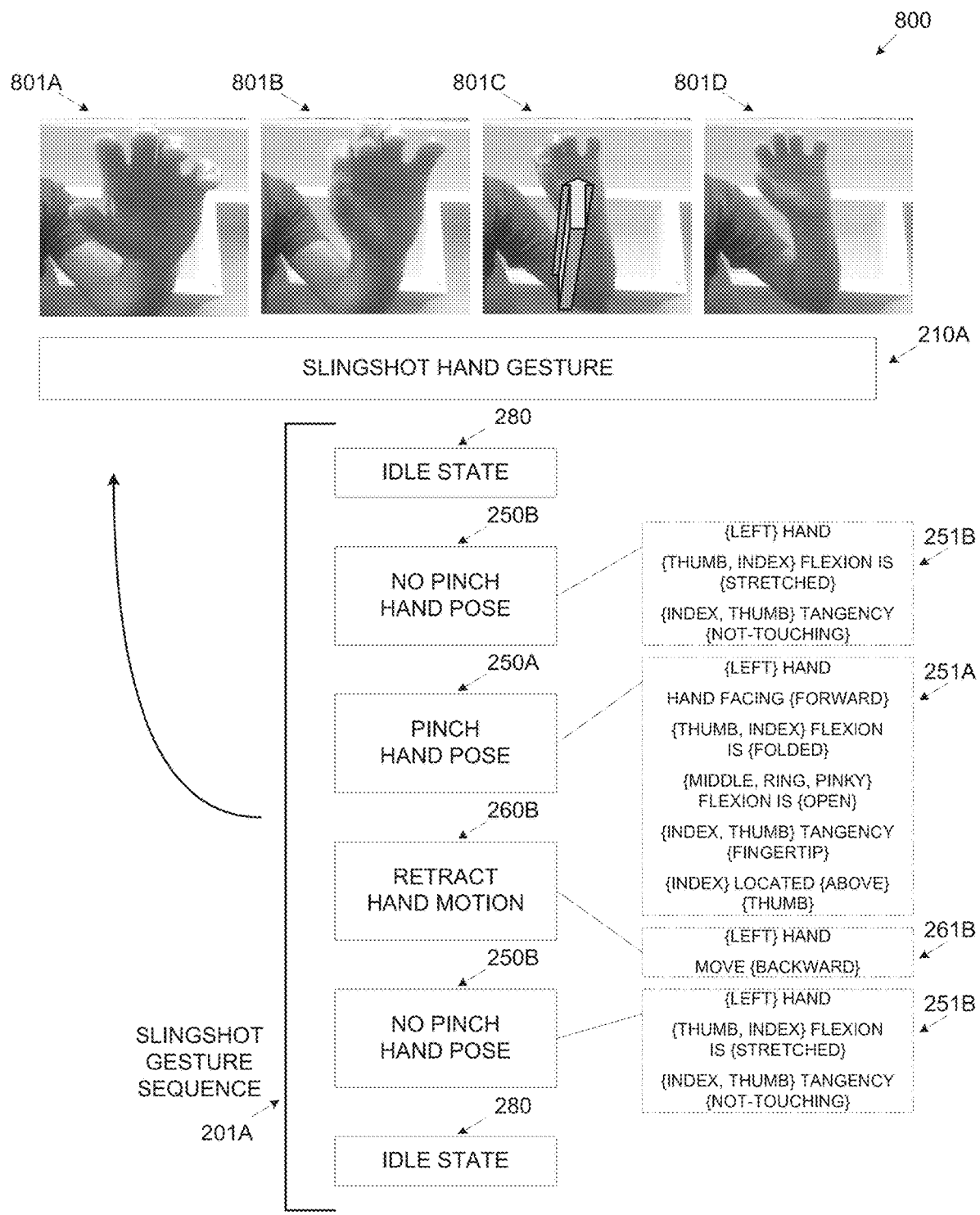
FIG. 8 is a block diagram of the building blocks of an exemplary slingshot hand gesture, according to some embodiments of the present disclosure.

Reference is now made to FIG. 8 which is a block diagram of the building blocks of an exemplary slingshot hand gesture, according to some embodiments of the present disclosure. Illustration 800 depicts an exemplary slingshot hand gesture 210A discrete representation as multiple hand poses such as the hand pose 250 and hand motions such as the hand motion 260. The slingshot hand gesture 210A which is visualized through image captures 801A, 801B, 801C and 801D is constructed of a combination and/or sequence of an idle state such as the virtual idle state 280, a no pinch hand pose 250B, a pinch hand pose such as the pinch hand pose 250A, a retract hand motion 260B and an end idle state such as the virtual idle state 280. The sequence of the slingshot hand gesture 210A is as follows:

A virtual idle state 280 defines the starting state and/or point of the sequence of the slingshot hand gesture 210A.

A no pinch hand pose 250B defined by a hand pose features record 251B represents no pinching action as depicted in image capture 801A.

A pinch hand pose 250A defined by the hand pose features record 251A in which a pinch action is identified as depicted in image capture 801B.

A retract hand motion 260B defined by a hand motion features record 261B in which the hand is moved backwards as is depicted in image capture 801C.

A no pinch hand pose 250B defined by the hand pose features record 251B represents the pinch pose is released and identified as no pinching action as depicted in image capture 801D.

An idle state 280 defines the end state and/or point of the sequence of the slingshot hand gesture 210A.

The sequence of the slingshot hand gesture 210A as described above is represented through a unique slingshot hand gesture sequence 251A which may be considered a sequential logic model associated with the slingshot hand gesture 210A. For each of the hand poses 250A, 250B and the hand motion 260B only relevant discrete pose and/or motion values may be defined. For example, the no pinch hand pose features record 251B is defined by the hand selection discrete pose value 411 (left), the finger flexion discrete pose value 421 (stretched) and the finger tangency discrete pose value 431 (not touching) are defined for the no pinch pose 250B. Other discrete pose values which are irrelevant to distinguishing between the no pinch hand pose 250B from the pinch hand pose 250A are left free and are not specified. Specifying only the relevant discrete pose and/or motion values allows for several degrees of freedom in the articulation of the hand poses 250 and/or hand motions 260 as performed by different one or more users at runtime. This means that each of the one or more users may perform the hand pose 250 and/or hand motion 260 slightly differently at runtime and yet they are still detected the same.

Reference is made once again to FIG. 1. As shown at 130, the one or more runtime hand datasets included in the received runtime sequence depicting the moving hand of the user are submitted to one or more SSVM functions together with the plurality of the pre-defined hand features records (hand pose features records and/or hand motion features records). The one or more SSVM functions generate a plurality of estimation terms which will later be used for estimating the runtime sequence as one of the plurality of hand gestures such as the hand gestures 210.

Conventions and Notations:
1) $x_t \in R^d$; $x_{1:t} = (x_1, \ldots, x_t)$
    $x_t$ is defined a set of discrete hand values scores for a specific runtime hand dataset at time t where each of the d scores corresponds to a particular hand feature, for example, index finger pointing forward, middle finger is touching the thumb, ring finger is folded and the likes. For brevity, the notation $x_{1:t}$ is used to describe $(x_1, \ldots, x_t)$.
2) $y_t \in Y_t$; $y_{1:t} = (y_1, \ldots, y_t)$
    $y_t$ is defined a set of pre-defined hand features records (hand pose features records and/or hand motion features records) associated with a specific hand gesture 210 which is part of the pre-defined hand gestures set $Y_t$ that is valid at time t.
    For brevity, the notation $y_{1:t}$ is used to describe $(y_1, \ldots, y_t)$.

The estimation terms include singleton terms and pairwise terms. The singleton terms relate to estimation terms in which each of the runtime hand datasets is simulated by the plurality of discrete hand values of the valid pre-defined hand features records (each defining one of the hand poses and/or hand motions included in the valid hand gestures 210). Calculation of the singleton terms is expressed in equation 1 below.

$$S(x_{1:T}, y_t) = \langle w_s, F_s(x_{1:t}, y_t) \rangle ; w_s \in R^{D_s} \quad \text{Equation 1:}$$

Where $S(x_{1:T}, y_t)$ is a set of singleton terms, $F_s(x_{1:t}, y_t)$ is a set of singleton features and $w_s$ is a set of weights assigned to each of the singleton features. The set of singleton terms as well as the set of weights $w_s$ may be created through a training session using the one or more SSVM functions to select singleton terms and weights that provide the best accuracy for the associated set of pre-defined hand features records.

The pairwise estimation terms relate to estimation terms in which each of the runtime hand datasets is simulated by the plurality of discrete hand values of a current pre-defined hand features record and a predecessor pre-defined hand features record of the valid pre-defined hand features records (each defining one of the hand poses and/or hand motions included in the valid hand gestures 210). Calculation of the pairwise terms is expressed in equation 2 below.

$$P(x_{1:T}, y_{t-1}, y_t) = \langle w_p, F_p(x_{1:t}, y_{t-1}, y_t) \rangle ; w_p \in R^{D_p} \quad \text{Equation 2:}$$

Where $P(x_{1:T}, y_{t-1}, y_t)$ is a set of pairwise terms, $F_p(x_{1:t}, y_{t-1}, y_t)$ is a set of pairwise features and $w_p$ is a set of weights assigned to each of the pairwise features. The set of pairwise terms as well as the set of weights $w_p$ may be created through a training session using the one or more SSVM functions to select pairwise terms and weights that provide the best accuracy for the associated set of pre-defined hand features records.

The sets of singleton features and the sets of the pairwise features are created by simulation of the discrete hand values defining the hand features records of the valid hand gestures 210 over the discrete hand values scores of the runtime hand datasets. The discrete hand values may be expressed in a Boolean form, for example, "(index finger is pointing up OR index finger is pointing right) AND (ring finger is touching the thumb)". Following this process the entire hand features record is represented by Boolean expressions. The Boolean expression may allow for efficient and/or simple simulation. The Boolean representation may take many forms, however the Boolean representation that presents best results may be, for example, CNF. CNF is a Boolean representation in which every Boolean expression may be expressed as AND operators over two or more OR operators, for example, "(palm facing forward OR palm facing upward OR palm facing LEFT) AND (index finger touching thumb OR middle finger touching thumb)". Simulating the discrete hand values defining the hand features records over the discrete hand values scores of the runtime hand datasets is performed using one or more of a plurality of parametric functions in which one or more parameters are used to achieve best simulation results. The generation of the singleton features is given in equations 3 below.

$$F_s(x_{1:t}, y_t) = \begin{bmatrix} \propto (x_t, y_t; \rho_1) \\ \vdots \\ \propto (x_t, y_t; \rho_{D_s}) \end{bmatrix} \quad \text{Equation 3}$$

Where $\propto(x_t, y_t; \rho)$ is a set of parametric functions from which the one that provides the singleton feature presenting best accuracy is selected. The set parametric functions is executed at runtime since the parameter $\rho$ which provides best accuracy results for the hand gesture detection process 100 may not be known in advance. The execution of the parametric functions for each of the singleton features may be performed using the one or more SSVM functions.

Similarly generation of the pairwise features is given in equations 4 below.

$$F_p(x_{1:t}, y_{t-1}, y_t) = \begin{bmatrix} \beta(x_t, y_{t-1}, y_t; \sigma_1) \\ \vdots \\ \beta(x_t, y_{t-1}, y_t; \sigma_{D_p}) \end{bmatrix} \quad \text{Equation 4}$$

Where $\beta(x_t, y_t; \sigma)$ is a set of parametric functions from which the one that provides the pairwise feature presenting best accuracy is selected. The set parametric functions is executed at runtime since the parameter $\sigma$ which provides best accuracy results for the hand gesture detection process 100 may not be known in advance. The execution of the parametric functions for each of the pairwise features may be performed using the one or more SSVM functions.

As shown at 140, the hand gesture detection process 100 proceeds to perform an optimization of one or more score functions which use the generated estimation terms (singleton terms and/or pairwise terms) to select a pre-defined hand gesture 210 that best fits the runtime sequence comprising the one or more runtime hand datasets. The score function is optimized by applying it to one or more sequences within an FSM such as the FSM 301, where each of the one or more sequences corresponds to one of the hand gestures 210. The score function is expressed in equation 5 below.

$$\max_{y_{1:T}} H(x_{1:T}, y_{1:T}) = \sum_{t=1}^{T} S(x_{1:T}, y_t) + \sum_{t=2}^{T} P(x_{1:T}, y_{t-1}, y_t) \quad \text{Equation 5}$$

Where the term $\max_{y_{1:T}} H(x_{1:T}, y_{1:T})$ represents the hand gesture 210 which matches most optimally the runtime sequence depicting the moving hand of the user at time t. The optimization may be done through dynamic programming employing, for example, viterbi decoding over an FSM such as the FSM 301 of each of the one or more of the plurality of valid hand gestures 210 after augmenting the FSM 301 with one or more of the score functions over one or more sequences within the FSM 301.

Optionally, the set of valid hand gestures 210 at the time t includes one or more hand gestures 210 which are not pre-defined but rather consisting one or more hand poses such as the hand poses 250 and/or hand motions such as the hand motions 260 which may be represented using the discrete hand values.

Optionally, the one or more SSVM functions are specialized by selecting the set of valid pre-defined hand gestures 210 at the time t to include only one or more registered hand gestures 210. The one or more registered hand gestures 210 may be considered valid with respect to a context of the runtime environment of the user. The context may describe one or more runtime execution parameters and/or conditions at the time t such as, for example, active application, user interaction state and/or limitation of hand gestures 210 available to the user at the time t. Specializing the one or more SSVM functions may further accelerate the optimization process to allow for a more rapid hand gesture detection process 100.

Figure 9:
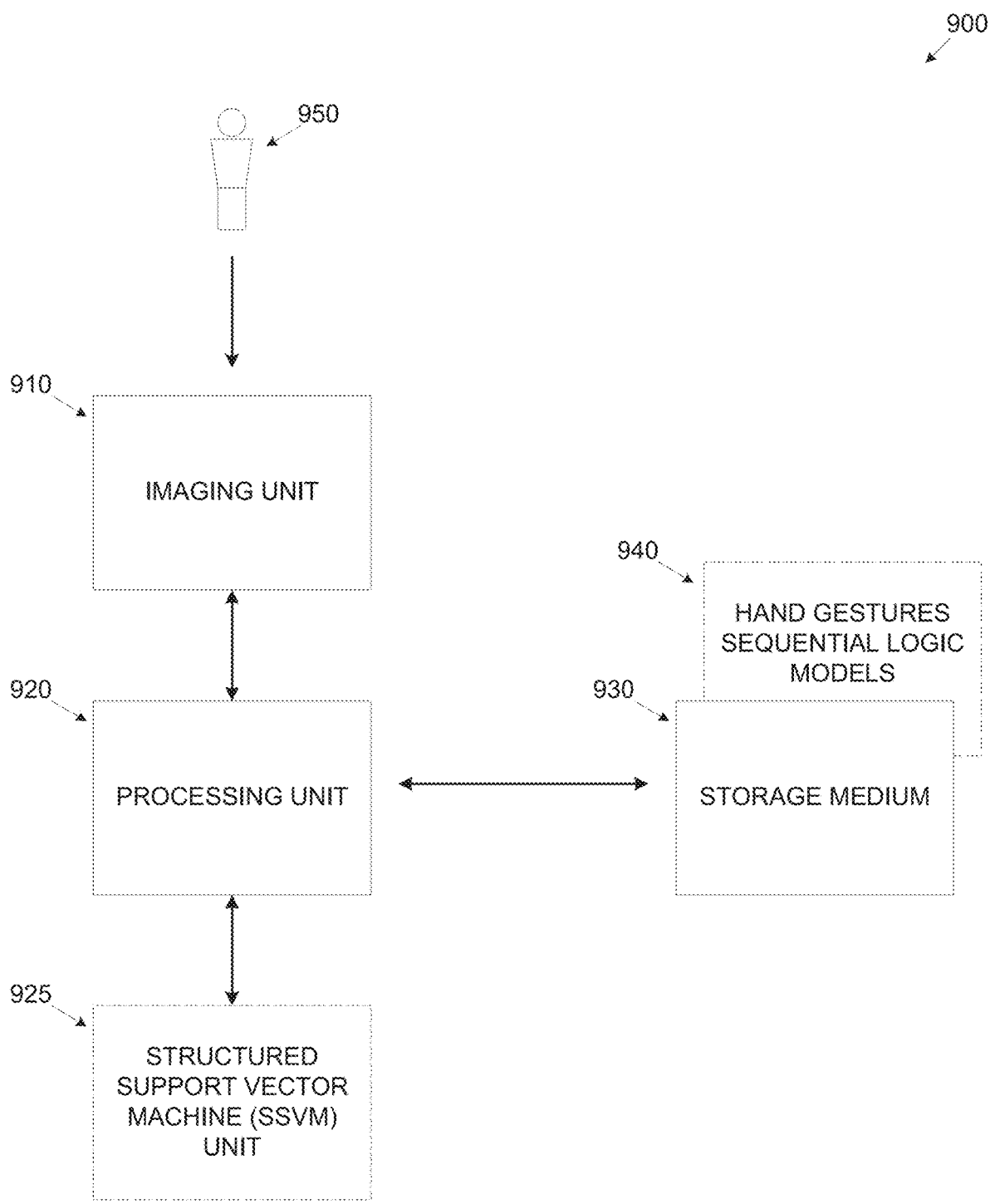
FIG. 9 is a schematic illustration of an exemplary system for detecting a hand gesture depicted by an image(s), according to some embodiments of the present disclosure.

Reference is now made to FIG. 9 which is a schematic illustration of an exemplary system for detecting a hand gesture depicted by an image(s), according to some embodiments of the present disclosure. An exemplary system 900 includes an imaging unit 910 for capturing one or more images of a moving hand of a user 950, one or more hardware processors 920 for detecting hand gestures such as the hand gestures 210 performed by the user 950 as depicted by the one or more captured images and a storage medium 430 for storing one or more pre-defined hand gestures sequential logic models 201 (each representing a corresponding hand gesture such as the hand gesture 210) and/or one or more trained SSVM functions. The imaging unit 910 may include one or more imaging devices, for example, a camera sensor, a stereo camera, a depth camera and/or an IR sensor. The imaging unit 910 which monitors the moving hand(s) of the user 950 may transmit to the processor 920 one or more captured images which are timed and synchronized. The one or more timed captured images are analyzed to create a runtime sequence of one or more runtime hand datasets each defined by one or more of a plurality of discrete hand values scores inferred from the one or more timed captured images. The processor 920 may employ a hand gesture detection process, such as the hand gesture detection process 100 to estimate an optimal one of the plurality of pre-defined hand gestures 210 (each represented by one of the sequential logic models 201) that best matches the runtime sequence of gestures performed by the user 950. Optionally, the system 900 includes an SSVM hardware unit 925 which may execute the SSVM function on one or more hardware circuits optimized for SSVM execution. The SSVM hardware unit 925 may efficiently and rapidly execute the one or more SSVM functions of the hand gesture detection process 100 thus reducing the computation load of the processor 920. Optionally, the SSVM hardware unit 925 is integrated within one or more of the processors 920.

According to some embodiments of the present disclosure, there are provided systems and methods for detecting multimodal user interaction acts. Each of the multimodal acts may include one or more user action, for example, a hand gesture such as the hand gesture 210, a head gesture, a body gesture, a facial expression, a gaze direction, a text, a voice, and/or a tactile input. Detection of the multimodal acts may be performed for a user using one or more computerized devices, for example, computer, mobile device, computerized machine and/or computerized appliance equipped and/or attached to one or more user interaction capturing devices, for example, an imaging device, a sound recorder, a tactile reception device, a text input device such as, for example, such as a keyboard, a digital pen, a touchpad and the likes, a touchscreen, a digital surface and/or a pointing device(s) such as for example, a mouse, a trackball, a game controller, a joystick and the likes.

The captured user interaction may be processed to identify the one or more multimodal acts. Once the one or more multimodal acts are identified, one or more associated functions, actions, operations and/or commands may be initiated. The multimodal acts may be classified and/or identified during runtime by employing one or more detection techniques to identify the one or more user actions constituting the multimodal act, for example, text input parsing, pointing device input analysis, speech analysis, tactile input analysis and specifically hand gesture detection using a hand gesture detection process such as the hand gesture detection process 100.

Figure 10:
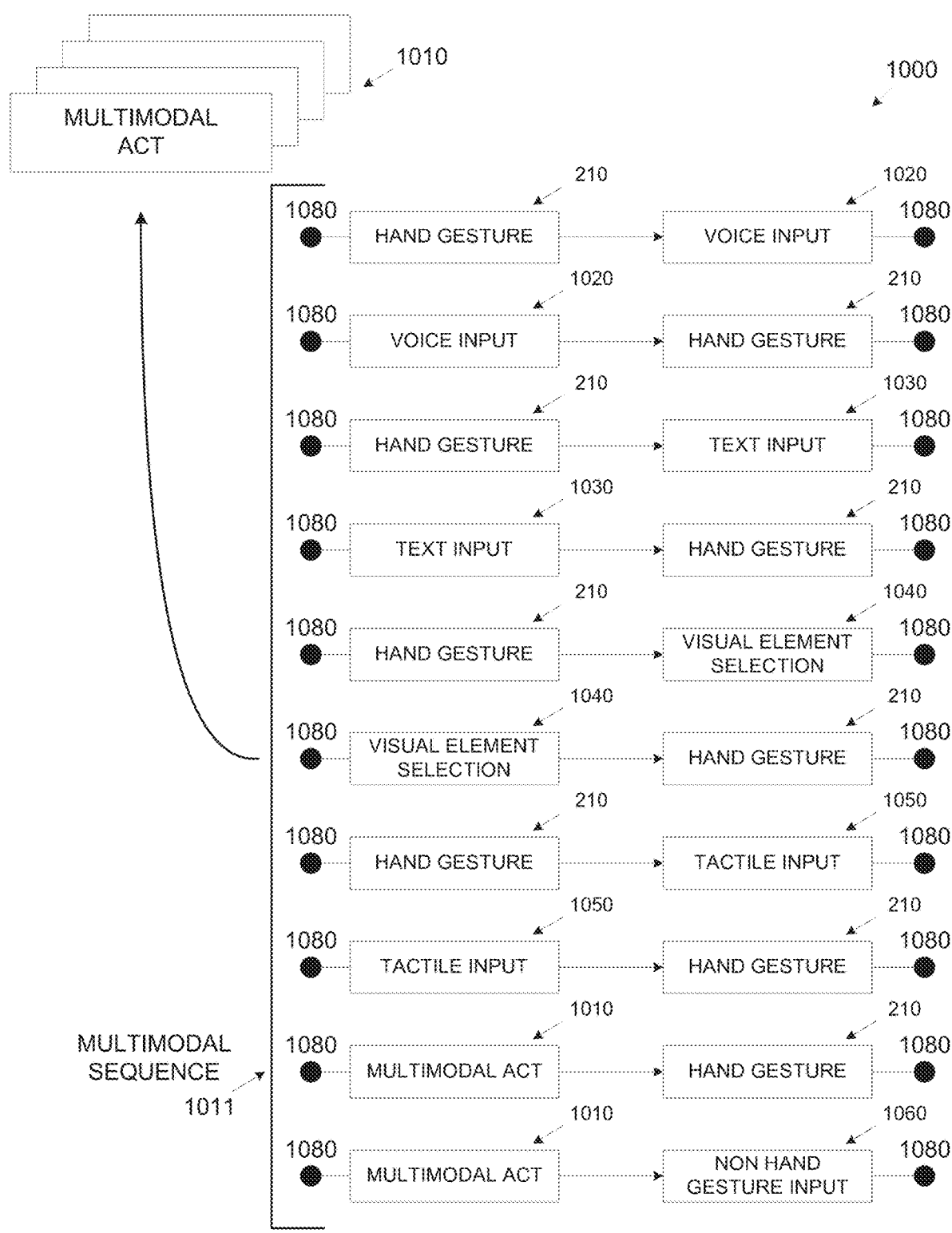
FIG. 10 is a block diagram of the building blocks of exemplary multimodal acts, according to some embodiments of the present disclosure.

Reference is now made to FIG. 10 which is a block diagram of the building blocks of exemplary multimodal acts, according to some embodiments of the present disclosure. Illustration 1000 depicts several construction schemes of exemplary multimodal acts 1010. The multimodal acts 1010 may be constructed as one or more possible constructions, for example:

(a) The multimodal act 1010 may be a combination and/or sequence of a hand gesture 210 a voice input 1020.
(b) The multimodal act 1010 may be a combination and/or sequence of the voice input 1020 and the hand gesture 210.
(c) The multimodal act 1010 may be a combination and/or sequence of the hand gesture 210 and a text input 1030.
(d) The multimodal act 1010 may be a combination and/or sequence of the text input 1030 and the hand gesture 210.
(e) The multimodal act 1010 may be a combination and/or sequence of the hand gesture 210 and a visual element selection 1040.
(f) The multimodal act 1010 may be a combination and/or sequence of the visual element selection 1040 and the hand gesture 210.

(g) The multimodal act 1010 may be a combination and/or sequence of the hand gesture 210 and a tactile input 1050.
(h) The multimodal act 1010 may be a combination and/or sequence of the tactile input 1050 and the hand gesture 210.
(i) The multimodal act 1010 may be a combination and/or sequence of another multimodal act 1010 and one of the hand gestures 210.
(j) The multimodal act 1010 may be a combination and/or sequence of another multimodal act 1010 and a non-gesture input 1060, for example, the voice input 1020, the text input 1030, the visual element, selection 1040 and/or the tactile input 1050.

The multimodal act 1010 may include multiple iterations of the constructions (i) and/or (j) above. Each multimodal act 1010 is defined by a unique combination and/or sequence represented by a multimodal sequence 1011 which comprises of one or more of the multimodal actions, for example, the hand gesture 210, the voice input 1020, the text input 1030, the visual element, selection 1040, the tactile input 1050 and/or the multimodal act 1010. Each of the multimodal acts 1010 starts and ends with an idle state 1080 which is a virtual state identifying the start and/or end of the unique multimodal sequence 1011 of the multimodal act 1010. The one or more multimodal actions which constitute the multimodal sequence 1011 may be defined to occur in sequence and/or in parallel to one another. The one or more hand gestures 210 and the one or more non-gesture input 1060 may support a context to each other thus making detection and/or classification of the multimodal act 1010 as there are fewer possible hand gestures 210 and/or non-gesture input 1060 candidates which are valid to match a runtime multimodal sequence of one or more user actions. For example, in case the multimodal act 1010 includes a voice input such as the voice input 1020 that specifies a text related application function, only hand gestures 210 relating to text manipulation may be considered during detection and/or classification.

Figure 11:
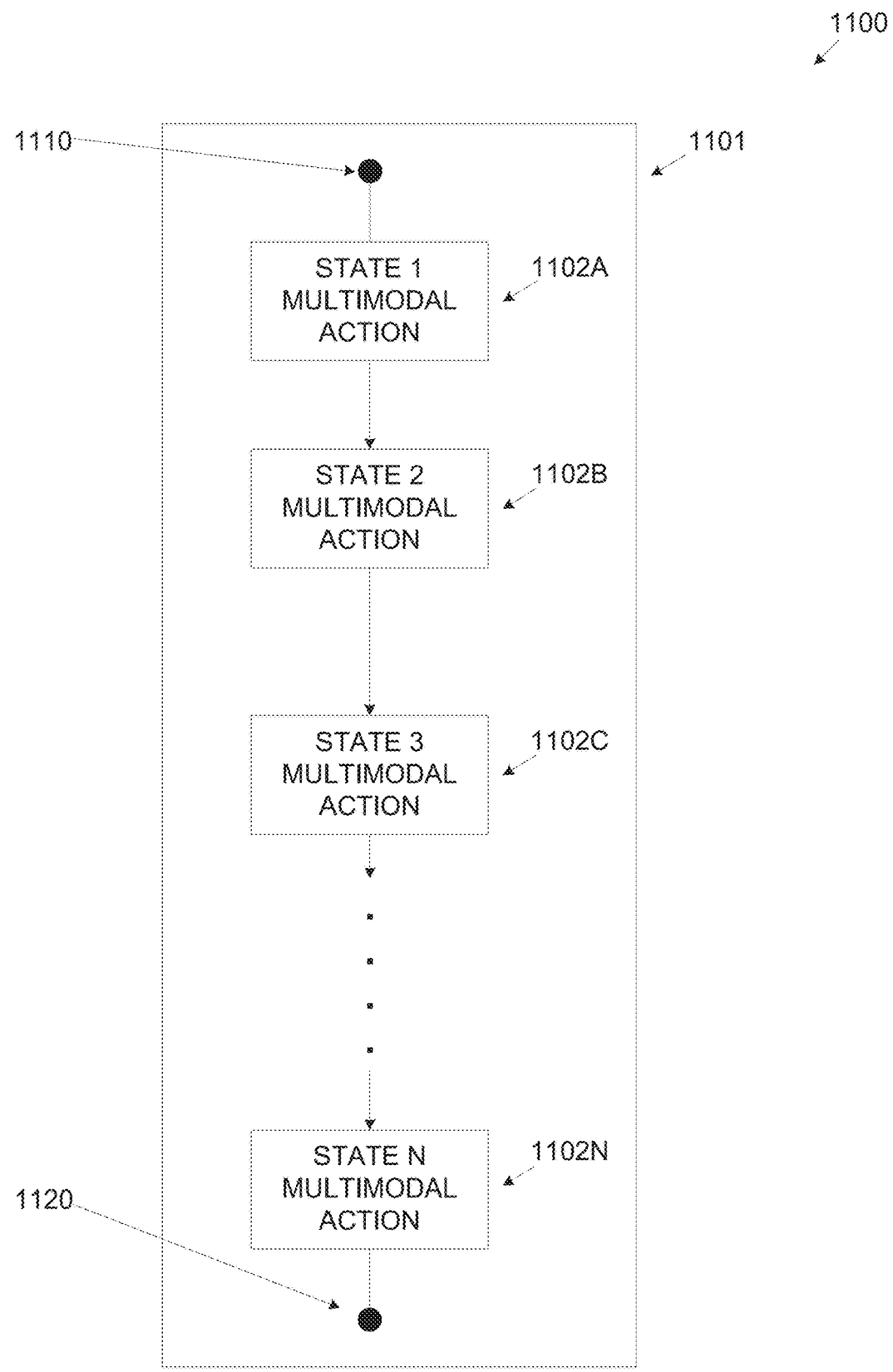
FIG. 11 is a schematic illustration of a multimodal FSM defining a multimodal act, according to some embodiments of the present disclosure.

Reference is now made to FIG. 11 which is a schematic illustration of a multimodal FSM defining a multimodal act, according to some embodiments of the present disclosure. An illustration 1100 depicts a multimodal FSM 1101 which may represent a multimodal sequence such as the multimodal sequence 1011 defining a multimodal act such as the multimodal act 1010. The multimodal FSM 1101 may represent one or more multimodal actions, for example, hand gestures such as the hand gestures 210 and/or non-gesture input such as the non-gesture input 1060. The multimodal FSM 1101 starts with a start point 1110 which may be a virtual state indicating an idle state of the multimodal FSM 1101 and may include one or more states 1102A, 1102B, 1102C through 1102N. Each of the states 1102A-1102N may represent one of the hand gestures 210 and/or the non-gesture input 1060. The multimodal FSM 1101 is ended with an FSM end point 1120 which identifies the completion of the multimodal sequence 1011 at which point the detection and/or classification process provides an estimation of the detected multimodal act. The start point 1110 and/or the end point 1120 may be defined by a virtual idle state such as the idle state 1080. Optionally, any transition between one or more of the multimodal FSM states 1102A-1102N may be detected and logged by a system and/or operating system (OS) and used for one or more of a plurality of uses, for example, use of the current active application, use of other one or more applications and/or use of the OS controlling the execution environment. Optionally, the multimodal FSM 1101 may be constructed as a complex multimodal act such as the multimodal acts 1010 by including repetitions of one or more of the states 1102A-1102N, splitting to several parallel and/or sequential paths and/or combining two or more multimodal FSMs 1101 and/or parts thereof. The multimodal sequence 1011 being represented as the multimodal FSM 1101 may improve detection and/or classification of the one or more multimodal acts 1010. More specifically, detection of the one or more hand gestures 210 included in the multimodal act 1010 may be highly improved since each of the hand gestures 210 is constructed using a discrete architecture. Each of t hand gestures 210 is defined by a hand gesture sequence such as the hand gesture sequence 201 represented by hand features records such as the hand features records. Each of the hand features records which is defined by discrete hand values scores each indicating a finite number of states of a corresponding hand feature which may be easily identified. Detection, recognition and/or classification may be simplified because there is no need for the user application to perform hand skeleton modeling for recognition, identification and/or classification of the hand gestures 210. Furthermore, computer learning and/or computer vision processing may be significantly reduced due to the discrete architecture as performed by the hand gesture detection process 100.

Figure 12:
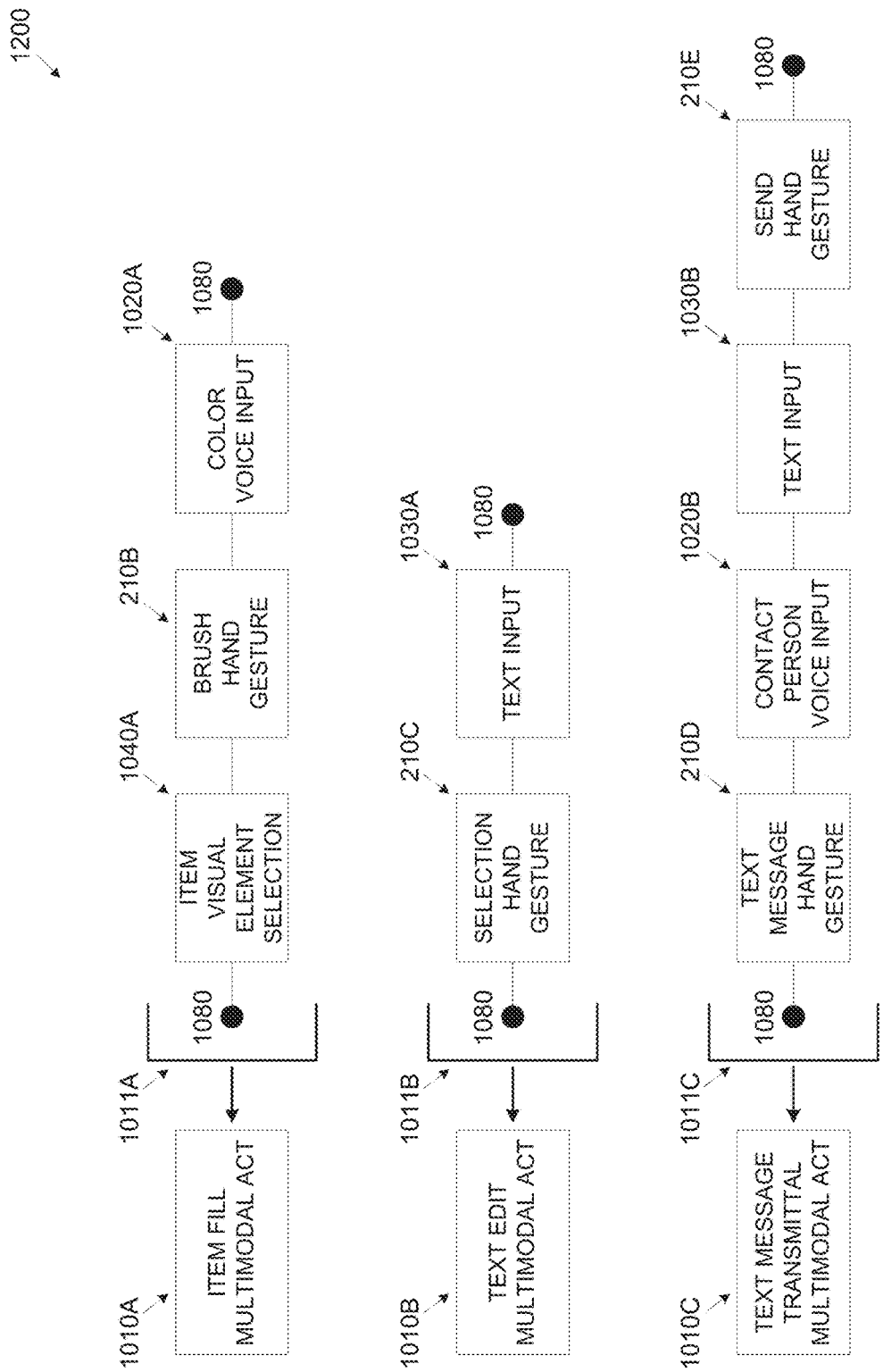
FIG. 12 is a schematic illustration of exemplary multimodal acts, according to some embodiments of the present disclosure.

Reference is now made to FIG. 12 which is a schematic illustration of exemplary multimodal acts, according to some embodiments of the present disclosure. An illustration 1200 depicts 3 multimodal acts 1010A, 1010B and 1010C such as the multimodal acts 1010. Each of the multimodal acts 1010A, 1010B and 1010C is defined by a multimodal sequence such as the multimodal sequence 1011, where a multimodal sequence 1011A defines the multimodal act 1010A, multimodal sequence 1011B defines the multimodal act 1010B and multimodal sequence 1011C defines the multimodal act 1010C. Each of the multimodal sequences 1011A, 1011B and 1011C starts and ends with an idle state such as the idle state 1080 identifying the start and the end of the multimodal acts 1010A, 1010B and 1010C respectively.

The multimodal act 1010A is associated with an item fill application function in, for example, a drawing tool application. As shown, the multimodal sequence 1011A includes 3 multimodal actions—an item visual element selection 1040A, a brush hand gesture 210B and a color voice input 1020A. The item visual element selection 1040A identifies an item in the drawing area of the drawing tool application. The item visual element selection 1040A may be detected, for example, as selection of an item using, for example, a touchscreen, a digital surface and/or a pointing device. The brush hand gesture 210B identifies a brush hand gesture, for example, swinging an open hand from left to right which is associated with an item fill application function relating to the item selected by the item visual element selection 1040A. The color voice input 1020A identifies the color, for example blue which is to be used to fill the item selected by the item visual element selection 1040A. The outcome of the multimodal act 1010A is the item selected by the item visual element selection 1040A is filled with blue color.

The multimodal act 1010B is associated with a text edit application function in, for example, a text editor application. As shown, the multimodal sequence 1011B includes 2 multimodal actions—a selection hand gesture 210C and a text input 1030A. The selection hand gesture 210C identifies a selection hand gesture, for example, moving a pointing index finger across a text presented on a screen by, for example, the text editing application to select a text location which needs editing. The text input 1030A inserts the new and/or modified text at the location identified by the selection hand gesture 210C. The outcome of the multimodal act 1010B is the text identified by the selection hand gesture 210C is updated with the text received by the text input 1030A.

The multimodal act 1010C is associated with a text message transmittal item application function using, for example, a text messaging application. As shown, the multimodal sequence 1011C includes 4 multimodal actions—a text message hand gesture 210D, a contact person voice input 1020B, a text input 1030B and a send hand gesture 210E. The text message hand gesture 210D, for example, making a scribble motion and thrusting the hand left is detected and initiates a text messaging application. The contact person voice input 1020B identifies a contact person from a contact list of the text messaging application. The text input 1030B inserts the message text to the message. The send hand gesture 210E, for example, thrusting a hand to the right is detected and initiates a transmittal operation of the message to the contact person identified by the contact person voice input 1020B.

It is expected that during the life of a patent maturing from this application many relevant DFE, HMI and/or NUI will be developed and the scope of the term DFE, HMI and/or NUI is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "hand gesture" or "at least hand gesture" may include a single hand gesture and/or two hands gestures.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to some embodiments of the present disclosure there is provided a computer implemented method for detecting a hand gesture of a user, comprising:
a) Receiving a plurality of sequential logic models each representing one of a plurality of hand gestures. The sequential logic model maps one or more of a plurality of pre-defined hand poses and pre-defined hand motions. Each one of the plurality of pre-defined hand poses and hand motions is represented by one of a plurality of pre-defined hand features records defined by one or more of a plurality of discrete hand values each indicating a state of one of a plurality of hand features of a reference hand.
b) Receiving a runtime sequence of a plurality of runtime hand datasets each defined by a plurality of discrete hand values scores each indicating a current state of a respective one of said plurality of hand features of a moving hand of a user. The plurality of discrete hand values score is inferred by an analysis of a plurality of timed images visually depicting the moving hand.
c) Submitting the plurality of runtime hand datasets and the plurality of pre-defined hand features records in one or more SSVM functions to generate a plurality of estimation terms for each of the plurality of runtime hand datasets with respect to the plurality of pre-defined hand features records.
d) Estimating which one of the plurality of hand gestures best matches the runtime sequence depicted in the plurality of timed images by optimizing one or more score functions which use the estimation terms for each of the plurality of runtime hand datasets within the runtime sequence.

Each one of the plurality of discrete hand values is represented by a Boolean formula which is defined in the form of a Conjunctive Normal Form (CNF).

The one or more SSVM functions generate the plurality of estimation terms by applying a plurality of parametric functions to each of the plurality of runtime hand datasets to identify one or more parametric function providing highest detection accuracy for each of the plurality of runtime hand datasets. Each one of the plurality of parametric functions simulates each of the plurality of discrete hand values over each of the plurality of discrete hand values scores.

The one or more SSVM functions comprise a plurality of sub-functions each receiving as an input one of the plurality of runtime hand datasets and one of the plurality of hand features records. Each of the plurality of sub-functions is assigned with a weight which is learned by the SSVM functions during a training session.

The one or more SSVM functions comprise a plurality of sub-functions each receiving as an input one of the plurality of runtime hand datasets and two of the plurality of hand features records which represent a current and a predecessor one of the plurality of hand poses and/or hand motions within the sequential logic model. Each of the plurality of sub-functions is assigned with a weight which is learned by the SSVM functions during a training session.

Optionally, the sequential logic model is represented as an FSM. Each state of said FSM correlates to a respective one of the plurality of pre-defined hand features records. The FSM is augmented with the said one or more score functions over one or more sequence within the FSM prior to the optimization.

Optionally, the one or more SSVM functions are specialized by selecting one or more of the plurality of sequential logic models which represents a context registered hand gesture from the plurality of hand gestures.

Optionally, the plurality of runtime hand datasets is estimated as one of a plurality of hand poses and/or hand motion which are not pre-defined.

Optionally, the detection includes detection of one or more of a plurality of multimodal acts. The one or more multimodal acts comprise one or more of the plurality of hand gestures and one or more non-gesture user interaction. The non-gesture user interaction is a member of a group consisting of a text input, a visual element selection, a tactile input and/or a voice input.

According to some embodiments of the present disclosure there is provided a system for detecting a hand gesture of a user, comprising a storage storing a plurality of pre-defined hand features records, a memory storing a code and one or more processors coupled to the storage and the memory for executing the stored code. The code comprising:
a) Code instructions to receive a plurality of sequential logic models each representing one of a plurality of hand gestures. The sequential logic model maps one or more of a plurality of pre-defined hand poses and pre-defined hand motions. Each one of the plurality of pre-defined hand poses and hand motions is represented by one of a plurality of pre-defined hand features records defined by one or more of a plurality of discrete hand values each indicating a state of one of a plurality of hand features of a reference hand.

b) Code instructions to receive a runtime sequence of a plurality of runtime hand datasets each defined by a plurality of discrete hand values scores each indicating a current state of a respective one of said plurality of hand features of a moving hand of a user. The plurality of discrete hand values score is inferred by an analysis of a plurality of timed images visually depicting the moving hand.

c) Code instructions to submit the plurality of runtime hand datasets and the plurality of pre-defined hand features records in one or more SSVM functions to generate a plurality of estimation terms for each of the plurality of runtime hand datasets with respect to the plurality of pre-defined hand features records.

d) Code instructions to estimate which one of the plurality of hand gestures best matches the runtime sequence depicted in the plurality of timed images by optimizing one or more score functions which use the estimation terms for each of the plurality of runtime hand datasets within the runtime sequence.

According to some embodiments of the present disclosure there is provided a software program product for detecting a hand gesture of a user, comprising a non-transitory computer readable storage medium and program instructions:

a) First program instructions to receive a plurality of sequential logic models each representing one of a plurality of hand gestures. The sequential logic model maps one or more of a plurality of pre-defined hand poses and pre-defined hand motions. Each one of the plurality of pre-defined hand poses and hand motions is represented by one of a plurality of pre-defined hand features records defined by one or more of a plurality of discrete hand values each indicating a state of one of a plurality of hand features of a reference hand.

b) Second program instructions to receive a runtime sequence of a plurality of runtime hand datasets each defined by a plurality of discrete hand values scores each indicating a current state of a respective one of said plurality of hand features of a moving hand of a user. The plurality of discrete hand values score is inferred by an analysis of a plurality of timed images visually depicting the moving hand.

c) Third program instructions to submit the plurality of runtime hand datasets and the plurality of pre-defined hand features records in one or more SSVM functions to generate a plurality of estimation terms for each of the plurality of runtime hand datasets with respect to the plurality of pre-defined hand features records.

d) Fourth program instructions to estimate which one of the plurality of hand gestures best matches the runtime sequence depicted in the plurality of timed images by optimizing one or more score functions which use the estimation terms for each of the plurality of runtime hand datasets within the runtime sequence.

The first, second, third and fourth program instructions are executed by one or more computerized processors from the non-transitory computer readable storage medium.

Optionally, detection of the software program product includes detection of one or more of a plurality of multimodal acts. The one or more multimodal act comprise one or more of the plurality of hand gestures and one or more non-gesture user interaction. The non-gesture user interaction is a member of a group consisting of a text input, a visual element selection, a tactile input and/or a voice input.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A computer implemented method of detecting a hand gesture of a user, comprising:

receiving a plurality of logic models representing a plurality of hand gestures, each said logic models correlating to at least one of a plurality of pre-defined hand poses and at least one of a plurality of pre-defined hand motions;

receiving a runtime sequence for a moving hand, the runtime sequence comprising a plurality of runtime hand datasets defining a plurality of discrete hand values indicating states of fingers or a palm of the moving hand through the runtime sequence, said plurality of discrete values being determined through analyses of a plurality of images visually depicting the moving hand;

generating a plurality of estimation terms defining a correlation between said runtime hand datasets and one of said plurality of pre-defined hand features records;

estimating, using a computerized processor executing at least one structured support vector machine (SSVM) function, which one of said plurality of hand gestures best matches said runtime sequence depicted in said plurality of images by optimizing at least one score function that uses said plurality of estimation terms for the plurality of runtime hand datasets within the runtime sequence, wherein the at least one SSVM function comprises a plurality of sub-functions each receiving as an input one of said plurality of runtime hand datasets and one of said plurality of hand features records, each of said plurality of sub-functions is assigned with a weight, said weight is learned by said at least one SSVM function during a training session.

2. The computer implemented method of claim 1, wherein each one of said plurality of discrete hand values is represented by a Boolean formula, said Boolean formula is defined in the form of a Conjunctive Normal Form (CNF).

3. The computer implemented method of claim 1, wherein the at least one SSVM function generates said plurality of estimation terms by applying a plurality of parametric functions to each of said plurality of runtime hand datasets to identify at least one parametric function providing a highest detection accuracy for each of said plurality of runtime hand datasets, each one of said plurality of parametric functions simulates each of said plurality of discrete hand values over each of said plurality of discrete hand values scores.

4. The computer implemented method of claim 1, wherein said estimation of which one of said plurality of hand gestures best matches said runtime sequence is performed, at least partially, through analyzing one or more pairwise terms identified through the training session.

5. The computer implemented method of claim 1, wherein said at least one SSVM function comprises a plurality of sub-functions each receiving as an input one of said plurality of runtime hand datasets and two of said plurality of hand features records which represent a current and a predecessor one of: said plurality of hand poses and said plurality of hand motions within said sequential logic model, each of said plurality of sub-functions is assigned with a weight, said weight is learned by said at least one SSVM function during the training session.

6. The computer implemented method of claim 1, wherein at least one logic model is represented as a finite state machine (FSM) having states correlating to a respective one of said plurality of pre-defined hand features records, said FSM configured to be augmented with said at least one score function over at least one sequence within said FSM prior to said optimization.

7. The computer implemented method of claim 1, further comprising selecting, by the at least one SSVM function, at least one of said plurality of logic models that represents a context registered hand gesture of said plurality of hand gestures.

8. The computer implemented method of claim 1, further comprising each one of said plurality of runtime hand datasets is estimated as one of a plurality of: hand poses and a hand motions which are not pre-defined.

9. The computer implemented method of claim 1, detecting at least one of a plurality of multimodal acts, said at least one multimodal act comprises at least one of said plurality of hand gestures and at least one non-gesture user interaction, said non-gesture user interaction is a member of a group consisting of: a text input, a visual element selection, a tactile input, and a voice input.

10. A system for detecting a hand gesture of a user, comprising:
a storage storing a plurality of pre-defined hand features records;
a memory storing a code;
at least one processor coupled to said storage and said memory for executing said stored code, said code comprising:
code instructions to receive a plurality of logic models representing a plurality of hand gestures, each said logic models correlating to maps at least one of a plurality of pre-defined hand poses and at least one of a plurality of pre-defined hand motions;
code instructions to receive a runtime sequence for a moving hand, the runtime sequence comprising a plurality of runtime hand datasets comprising a plurality of discrete hand values indicating states of fingers or a palm of the moving hand through the runtime sequence, said plurality of discrete hand values being determined through analyses of a plurality of images visually depicting the moving hand;
code instructions to generate a plurality of estimation terms defining a correlation between said runtime hand datasets and one of said plurality of pre-defined hand features records, s;
code instructions executing at least one structured support vector machine (SSVM) function to estimate which one of said plurality of hand gestures best matches said sequence depicted in said plurality of images by optimizing at least one score function that uses said plurality of estimation terms for the plurality of runtime hand datasets within the runtime sequence,
wherein the at least one SSVM function comprises a plurality of sub-functions each receiving as an input one of said plurality of runtime hand datasets and one of said plurality of hand features records, each of said plurality of sub-functions is assigned with a weight, said weight is learned by said at least one SSVM function during a training session.

11. The system of claim 10, wherein each one of said plurality of discrete hand values is represented by a Boolean formula, said Boolean formula is defined in the form of a Conjunctive Normal Form (CNF).

12. The system of claim 10, wherein code instructions for the at least one SSVM function generates said plurality of estimation terms by applying a plurality of parametric functions to each of said plurality of runtime hand datasets to identify at least one parametric function providing a highest detection accuracy for each of said plurality of runtime hand datasets, each one of said plurality of parametric functions simulates each of said discrete hand values over each of said discrete hand values scores.

13. The system of claim 10, wherein said estimation of which one of said plurality of hand gestures best matches said runtime sequence is performed, at least partially, through analyzing one or more pairwise terms identified through the training session.

14. The system of claim 10, wherein said at least one SSVM function comprises a plurality of sub-functions each receiving as an input one of said plurality of runtime hand datasets and two of said plurality of hand features records which represent a current and a predecessor one of: said plurality of hand poses and hand motions within said sequential logic model, each of said plurality of sub-functions is assigned with a weight, said weight is learned by said at least one SSVM function during the training session.

15. The system of claim 10, further comprising said logic model is represented as an FSM, each state of said FSM correlates to a respective one of said plurality of pre-defined hand features records, said FSM is augmented with said at least one score function over at least one sequence within said FSM prior to said submitting in said optimization.

16. The system of claim 10, further comprising code instructions for the at least one SSVM function configured to select at least one of said plurality of sequential logic models that represents a context registered hand gesture.

17. The system of claim 10, further comprising code instructions to detect at least one of a plurality of multimodal acts, said at least one multimodal act comprises at least one of said plurality of hand gestures and at least one non-gesture user interaction, said non-gesture user interaction is a member of a group consisting of: a text input, a visual element selection, a tactile input, and a voice input.

18. A software program product for detecting a hand gesture of a user, comprising: a non-transitory computer readable storage media; first program instructions to receive a plurality of logic models representing a plurality of hand gestures, said logic models correlating to at least one of a plurality of pre-defined hand poses and pre-defined hand motions; second program instructions to receive a runtime sequence of a plurality of runtime hand datasets comprising plurality of discrete hand values indicating current states for a plurality of different fingers or a palm of a hand, said plurality of discrete hand values being determined through analyses of a plurality of images visually depicting said moving hand; third program instructions to generate a plurality of estimation terms based on the plurality of current states of the plurality of different fingers or the palm of the hand, the plurality of estimation terms defining a correlation between said runtime hand datasets and one of said plurality of pre-defined hand features records, the estimation terms comprising pairwise terms that correlate the runtime hand datasets to two of said plurality of pre-defined hand features records; and fourth program instructions executing at least one structured support vector machine (SSVM) function to estimate which one of said plurality of hand gestures best matches said runtime sequence depicted in said plurality of timed images by optimizing at least one score function which uses said plurality of estimation terms, comprising the pairwise terms, for each of said plurality of runtime hand datasets within said runtime sequence, wherein said first, second, third and fourth program instructions are executed by at least one computerized processor from said computer readable storage media, wherein each of said plurality of finger features is selected from a group consisting of a finger flexion state, a finger curve state, a finger touch condition, a finger touch type, or a relative location of one finger in relation to another, wherein the at least one SSVM function comprises a plurality of sub-functions each receiving as an input one of said plurality of runtime hand datasets and one of said plurality of hand features records, each of said plurality of sub-functions is assigned with a weight, said weight is learned by said at least one SSVM function during a training session.

19. The computer implemented method of claim 1, wherein each one of said plurality of discrete hand values is represented by a Boolean formula, said Boolean formula is defined in the form of a Conjunctive Normal Form (CNF).

20. The software program product of claim 18, further comprising fifth program instructions comprising the at least one SSVM function configured to generate said plurality of estimation terms by applying a plurality of parametric functions to each of said plurality of runtime hand datasets to identify at least one parametric function providing a highest detection accuracy for each of said plurality of runtime hand datasets, each one of said plurality of parametric functions simulates each of said discrete hand values over each of said discrete hand values scores.

21. The software program product of claim 18, said estimation of which one of said plurality of hand gestures best matches said runtime sequence is performed, at least partially, through analyzing one or more pairwise terms identified through the training session.

22. The software program product of claim 18, further comprising fifth program instructions comprising the at least one SSVM function comprises a plurality of sub-functions each receiving as an input one of said plurality of runtime hand datasets and two of said plurality of hand features records which represent a current and a predecessor one of: said plurality of hand poses and said plurality of hand poses hand motions within said sequential logic model, each of said plurality of sub-functions is assigned with a weight, said weight is learned by said at least one SSVM function during the training session.

23. The software program product of claim 18, wherein comprising said logic model is represented as an FSM, each state of said FSM correlates to a respective one of said plurality of pre-defined hand features records, said FSM is augmented with said at least one score function over at least one sequence within said FSM prior to said optimization.

24. The software program product of claim 18, further comprising the at least one SSVM function configured to select at least one of said plurality of sequential logic models which represents a context registered hand gesture of said plurality of hand gestures.

25. The software program product of claim 18, further comprising fifth program instructions configured to detect at least one of a plurality of multimodal acts, said at least one multimodal act comprises at least one of said plurality of hand gestures and at least one non-gesture user interaction, said non-gesture user interaction is a member of a group consisting of: a text input, a visual element selection, a tactile input, and a voice input.

* * * * *